United States Patent
Frank et al.

(10) Patent No.: US 10,651,904 B2
(45) Date of Patent: May 12, 2020

(54) METHOD AND APPARATUS FOR RECEIVING A SCALED PRECODED DATA SIGNAL

(71) Applicant: MOTOROLA MOBILITY LLC, Chicago, IL (US)

(72) Inventors: Colin Frank, Park Ridge, IL (US); Tyler A. Brown, Lake Zurich, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/237,543

(22) Filed: Dec. 31, 2018

(65) Prior Publication Data

US 2019/0140716 A1    May 9, 2019

Related U.S. Application Data

(63) Continuation of application No. 15/016,162, filed on Feb. 4, 2016, which is a continuation-in-part of application No. 13/367,799, filed on Feb. 7, 2012, now Pat. No. 9,294,179.

(60) Provisional application No. 62/165,877, filed on May 22, 2015.

(51) Int. Cl.
| | |
|---|---|
| *H04B 7/0456* | (2017.01) |
| *H04B 7/0413* | (2017.01) |
| *H04B 7/06* | (2006.01) |
| *H04B 7/0452* | (2017.01) |

(52) U.S. Cl.
CPC ......... *H04B 7/0478* (2013.01); *H04B 7/0413* (2013.01); *H04B 7/0465* (2013.01); *H04B 7/0617* (2013.01); *H04B 7/0619* (2013.01); *H04B 7/0632* (2013.01); *H04B 7/0639* (2013.01); *H04B 7/0452* (2013.01)

(58) Field of Classification Search
CPC .. H04B 7/0413; H04B 7/0452; H04B 7/0634; H04L 2025/03426; H04L 25/03343; H04W 24/02; H04W 88/02; H04W 88/08; H04W 52/146
USPC ........................................................ 375/267
See application file for complete search history.

(56) References Cited

U.S. PATENT DOCUMENTS

| | | | | |
|---|---|---|---|---|
| 2009/0202020 A1* | 8/2009 | Hafeez | .............. | H04B 7/022 375/299 |
| 2012/0314570 A1* | 12/2012 | Forenza | .............. | H04B 7/024 370/230 |
| 2013/0265899 A1* | 10/2013 | Sayana | .............. | H04W 24/00 370/252 |

* cited by examiner

*Primary Examiner* — Leila Malek

(74) *Attorney, Agent, or Firm* — Loppnow & Chapa; Matthew C. Loppnow

(57) ABSTRACT

A scaled precoded data signal can be received. The scaled precoded data signal can be based on a precoder-dependent scaling factor. The scaled precoded data signal can be scaled by using a precoder dependent scaling factor that is dependent on a precoder used to precode the data signal. The scaled precoded data signal can be demodulated.

22 Claims, 11 Drawing Sheets

METHOD AND APPARATUS FOR RECEIVING A SCALED PRECODED DATA SIGNAL

BACKGROUND

1. Field

The present disclosure is directed to a method and apparatus for optimizing antenna precoder selection with coupled antennas.

2. Introduction

The precoding matrices defined in the 3rd Generation Partnership Project (3GPP) wireless communication protocols and elsewhere are generally believed to yield a set of antenna patterns having equal energy. However, there is a contradiction in the specification in that if the precoding matrices are applied in a way that the resulting antenna patterns are equal in energy, the precoding matrix-based channel estimates used for demodulation, precoding matrix selection, and channel quality estimation will have scaling error. Furthermore, the scaling error will be a function of the precoding matrix. Conversely, if the precoding matrices are applied in such a way that the precoding matrix-based channel estimation is correct, then the resulting antenna patterns will not have equal energy and precoding matrix selection via feedback from the UE will not be optimal. In the selection of the precoding matrices in the 3GPP specification, it was assumed that the energy of the antenna pattern is proportional to the energy of the precoding matrix. However, without normalization of the antenna patterns, it can be shown that for some precoding matrices, the energy of the resulting antenna pattern is significantly greater than the energy of the precoding matrix. Conversely, for other precoding matrices, the energy of the resulting antenna pattern is less than the energy of the precoding matrix.

In 3GPP, the current method used to estimate the channel gain for the data assumes that no re-scaling of the antenna pattern is necessary to maintain unit energy for all precoding matrix indicators. If the data symbols are transmitted with equal energy for all precoding matrices and if no PMI-based renormalization is performed at the UE, the precoding matrix indicator/cell-specific reference symbol (PMI/CRS)-based channel estimate will be in error. In order to compute the optimal PMI-channel quality indicator (CQI) pair, the UE must be able to compute the complex channel that would result from the application of a given PMI. With the current model, the UE does not renormalize the pattern gain for each PMI and thus the corresponding channel gain estimate used to determine the CQI will erroneous if the data symbols are transmitted with equal energy. As a result, the wrong PMI-CQI pair may be sent to the UE. Further, even if the correct PMI is chosen, the corresponding CQI may be in error. The problems described above can be expected to be most significant when the eNB antenna array is closely spaced (e.g., half-wavelength spaced arrays). The normalization issue is less significant with diversity-spaced arrays but may still be problematic.

Furthermore, an array of antenna elements can be used to reduce the power needed to transmit data from a transmitter to a receiver relative to the power needed to transmit the data with a single element of the array. This reduction in transmit power is due to the ability of the antenna array to focus the radiated power in the direction of the intended receiver. A further benefit of the antenna array is that the reduction in transmit power results in reduced interference for receivers not in the direction of the targeted receiver. Because of these benefits, antenna arrays are supported in multiple wireless communication standards, including the IEEE 802.11n, 802.11ac, 802.11ad specifications, the 3GPP HSPA and LTE specifications, and the 802.16 specifications.

In the 3GPP LTE specifications, antenna precoding matrices are defined which can be used for beamforming For an antenna array with M elements, the antenna precoders have dimension M×1. For multi-layer transmissions with K layers, the antenna precoders have dimension M×K, where the i-th column of the matrix is used for the i-th transmission layer. Each of the precoding matrices have the property that the Frobenius norm of each column of the matrix is equal to unity. As used in the 3GPP specification, the receiver selects the "best" precoder and signals this precoder back to the transmitter, where the best precoder is that which maximizes a performance metric such as the signal-to-interference plus noise ratio and/or the link throughput. In order to enable the receiver to evaluate the precoders, reference symbols are transmitted which can be used by the receiver to estimate the channel between each of the antenna array elements and the receiver. The receiver then computes the inner product of the precoder with the conjugate of the channel estimate in order to determine the channel that would be observed by the receiver if this precoder were to be applied.

From a system perspective, this precoder selection methodology is optimal in that it maximizes the performance metric, signal-to-interference plus noise ratio or throughput, for a fixed amount of transmit power. However, there is a problem that occurs if there is significant coupling of the transmit antennas. In particular, the transmitted power can vary significantly (by several dB) over the set of precoders even if all of the precoders have equal Frobenius norm. The degree of transmit power variation over the set of precoders will depend on multiple factors including the mutual coupling between the antenna elements and the circuitry used to implement the precoders and drive the antenna array. Unfortunately, present systems do not take these factors into account for precoder selection.

Thus, there is a need for a method and apparatus for optimizing antenna precoder selection with coupled antennas.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide a method and apparatus for optimizing antenna precoder selection with coupled antennas.

According to a possible embodiment of a receiving device, a power metric corresponding to each precoder of a plurality of precoders can be received. Reference signals can be received. A transmission channel corresponding to each precoder can be estimated based on the reference signals. The estimate of the transmission channel can be scaled based on the power metric for each precoder. A channel quality metric for each precoder can be generated based on the scaled estimate of the transmission channel An index of a precoder with the largest channel quality metric and the channel quality metric can be transmitted.

According to a possible corresponding embodiment of a transmitting device, a power metric corresponding to each precoder of a plurality of precoders can be generated. The power metric can be transmitted. Reference signals can be transmitted. An index of a precoder with a largest channel quality metric based on the power metric and the reference signals can be received.

According to another possible embodiment of a transmitting device, a data signal can be received. The data signal can be precoded. The precoded data signal can be scaled using a precoder-dependent scaling factor. The scaled precoded data signal can be transmitted through a plurality of antennas.

According to a possible corresponding embodiment of a receiving device, a scaled precoded data signal based on a precoder-dependent scaling factor can be received. The scaled precoded data signal can be demodulated.

Figure 1:
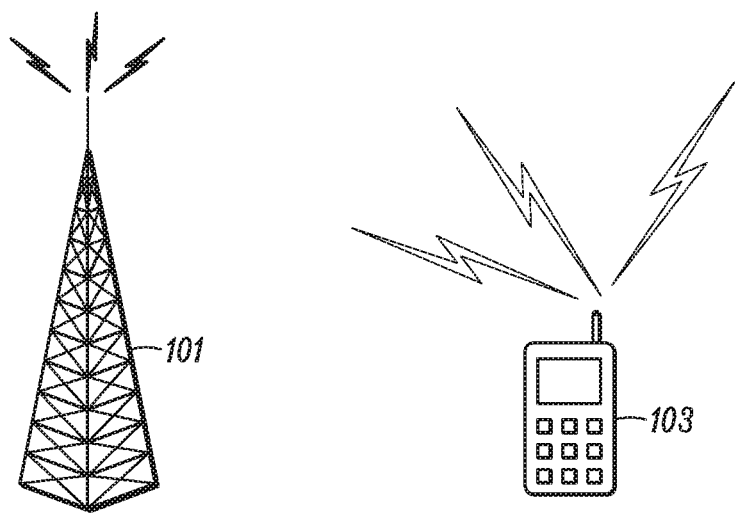
FIG. 1 illustrates a wireless communication system according to a possible embodiment.
Figure 1:
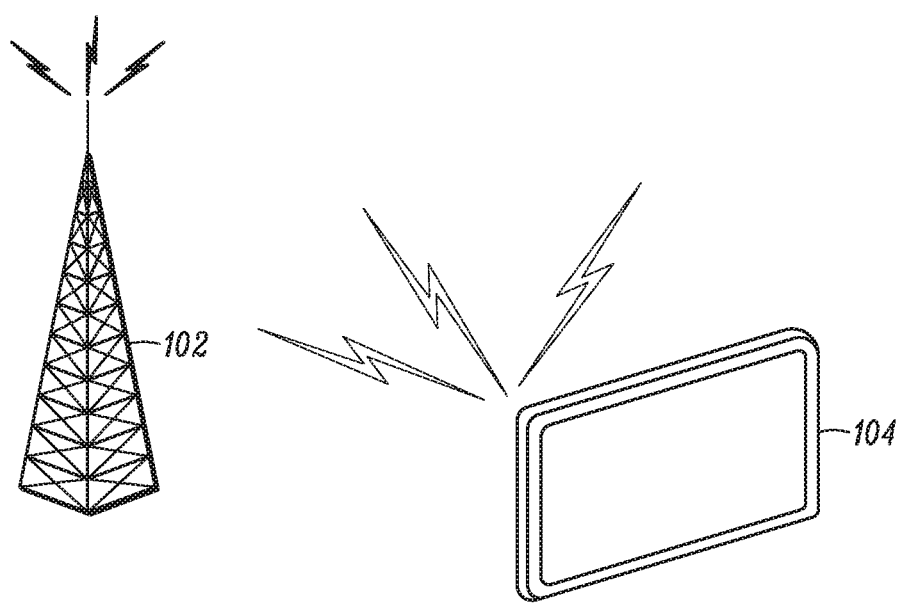

In FIG. 1, a wireless communication system 100 comprises one or more fixed base infrastructure units 101, 102 forming a network distributed over a geographical region for serving remote units in the time, frequency, code or spatial domain or a combination thereof according to a possible embodiment. A base unit may also be referred to as an access point, access terminal, base, base station, NodeB, enhanced NodeB (eNodeB), Home NodeB (HNB), Home eNodeB (HeNB), Macro eNodeB (MeNB), Donor eNodeB (DeNB), relay node (RN), femtocell, femto-node, pico-cell, network node or by other terminology used in the art or as defined further below. A base unit can be a transmitting device as well as a receiving device. The one or more base units each comprise one or more transmitters for downlink transmissions and one or more receivers for uplink transmissions. The base units are generally part of a radio access network that includes one or more controllers communicably coupled to one or more corresponding base units. The access network is generally communicably coupled to one or more core networks, which may be coupled to other networks like the Internet and public switched telephone networks among others. These and other elements of access and core networks are not illustrated but are known generally by those having ordinary skill in the art.

In FIG. 1, the one or more base units serve a number of remote units 103, 104 within a corresponding serving area, for example, a cell or a cell sector, via a wireless communication link. The remote units may be fixed or mobile. The remote units may also be referred to as subscriber units, mobiles, mobile stations, mobile units, users, terminals, subscriber stations, user equipment (UE), user terminals, wireless communication devices, relay nodes, or by other terminology used in the art. A remote unit can be a transmitting device as well as a receiving device. The remote units also comprise one or more transmitters and one or more receivers. In FIG. 1, the base unit 101 transmits downlink communication signals to serve remote unit 103 in the time, frequency and/or spatial domain. The remote unit 104 communicates with base unit 102 via uplink communication signals. Sometimes the base unit is referred to as a serving or connected or anchor cell for the remote unit. The remote units may also communicate with the base unit via a relay node.

In one implementation, the wireless communication system is compliant with the 3GPP Universal Mobile Telecommunications System (UMTS) LTE protocol, also referred to as EUTRA that facilitate the use of multiple input single output (MISO) or multiple input and multiple output (MIMO) antenna systems on the downlink to increase capacity. In EUTRA, the base unit transmits using an orthogonal frequency division multiplexing (OFDM) modulation scheme on the downlink and the user terminals transmit on the uplink using a single carrier frequency division multiple access (SC-FDMA) scheme. The instant disclosure is particularly relevant to 3GPP LTE Release 8 (Rel-8) and later versions thereof. The present disclosure is more generally applicable to other existing or future wireless communication systems implementing MISO or MIMO transmissions on the uplink or downlink, such as the IEEE 802.11 and IEEE 802.16 series of specifications. Thus the disclosure is not intended to be implemented in any particular wireless communication system architecture or protocol.

In EUTRA systems, MIMO antenna systems are employed at the eNB through use of multiple transmit antennas and at the UE through use of multiple receive antennas. A UE may rely on a pilot or reference symbol (RS) sent from the eNB for channel estimation, subsequent data demodulation, and link quality measurement for reporting. The link quality measurements for feedback may include such spatial parameters as rank indicator (RI), or the number of data streams sent on the same resources, precoding matrix index (PMI), and coding parameters such as a modulation and coding scheme (MCS) or a channel quality indicator (CQI). Together MCS or CQI, PMI and RI constitute elements of the Channel State Information (CSI) which conveys the quality of a MIMO channel indicative of the reliability and condition number of the channel capable of supporting multi-stream communications between the eNB and the UE. For example, if a UE determines that the link can support a rank greater than one, it may report multiple CQI values (e.g., two CQI values when rank=2 by signaling of the corresponding RI). Further, the link quality measurements may be reported on a periodic or aperiodic basis, as instructed by an eNB, in one of the supported feedback modes. The reports may include wideband or sub-band frequency selective information of the parameters. The eNB may use the rank information, the CQI, and other parameters, such as uplink quality information, to serve the UE on the uplink and downlink channels. Spatial multiplexing transmission can either be based on cell-specific reference symbols (CRS) (i.e., UE utilizes CRS for both CQI/PMI/RI estimation and for demodulation) or based on demodulation reference symbol (DMRS) (i.e., UE uses either CRS or CSI-RS for CQI/PMI/RI estimation and uses a DMRS for demodulation).

In EUTRA systems, an uplink (UL) data channel may be a Physical Uplink Shared Channel (PUSCH), an UL control channel may be a physical uplink control channel (PUCCH), a downlink (DL) control channel may be a physical downlink control channel (PDCCH), and DL data channel may be a physical downlink shared channel (PDSCH). UL control information may be communicated over the PUCCH and/or the PUSCH and DL control information is communicated typically over the PDCCH. The UE may further transmit uplink sounding reference signals to assist the eNB on scheduling uplink transmission (for frequency division duplex (FDD)) and for one or both UL and DL transmissions for time-division duplex (TDD). On the UL, the UE may transmit using contiguous or non-contiguous resource allocations and the UE may also transmit data and control on the UL simultaneously using the so-called simultaneous PUCCH and PUSCH transmission scheme. In Frequency Division Duplex (FDD) operation, the frame structure in the UL and DL, each comprises of a 10 millisecond (ms) radio frame, which is in turn divided into ten sub-frames each having a 1 ms duration wherein each sub-frame is divided into two slots of 0.5 ms each, wherein each slot contains a number of OFDM symbols. The DL and UL bandwidth are subdivided into resource blocks, wherein each resource block (RB) comprises of one or more subcarriers in frequency and one or more OFDM symbols in the time domain (12 subcarriers×7 OFDM symbols for normal Cyclic Prefix (CP)). In LTE resource blocks are defined on a slot basis. A resource block (RB) is a typical unit in which the resource allocations are assigned for the uplink and downlink communications.

In EUTRA, the eNB configures appropriate channels for UL and DL control information exchange. For the DL, the PDCCH is used for sending the UL and DL control information to the UEs. The PDCCH is sent in the beginning portion of a sub-frame on a potentially variable number of OFDM symbols, and this number (typically 0 to 3 for large system bandwidths such as 5 MHz, etc. and 0 to 4 for smaller system bandwidths such as 1.25 MHz) is signaled on the Physical Control Format Indicator Channel (PCFICH) or sent via higher layer signaling. However, in other scenarios, the PDCCH may also be located in certain fixed or variable time/frequency/spatial resources i.e., spanning one or more subcarriers in one or more sub-frames and/or one or more spatial layers. For example, it may occupy a subset of resource blocks instead of spanning the entire DL system bandwidth. The Physical Hybrid ARQ Channel (PHICH) is the Acknowledgment indicator channel used to send the HARQ feedback on the DL for the UL data transmissions from the UE. The PCFICH, PHICH, PDCCH are sent on OFDM symbols at the beginning of the DL sub-frames. In some sub-frames such as ABS or when the eNB has no UEs scheduled (i.e., very low or no load cases) these channels may be absent.

Figure 2:
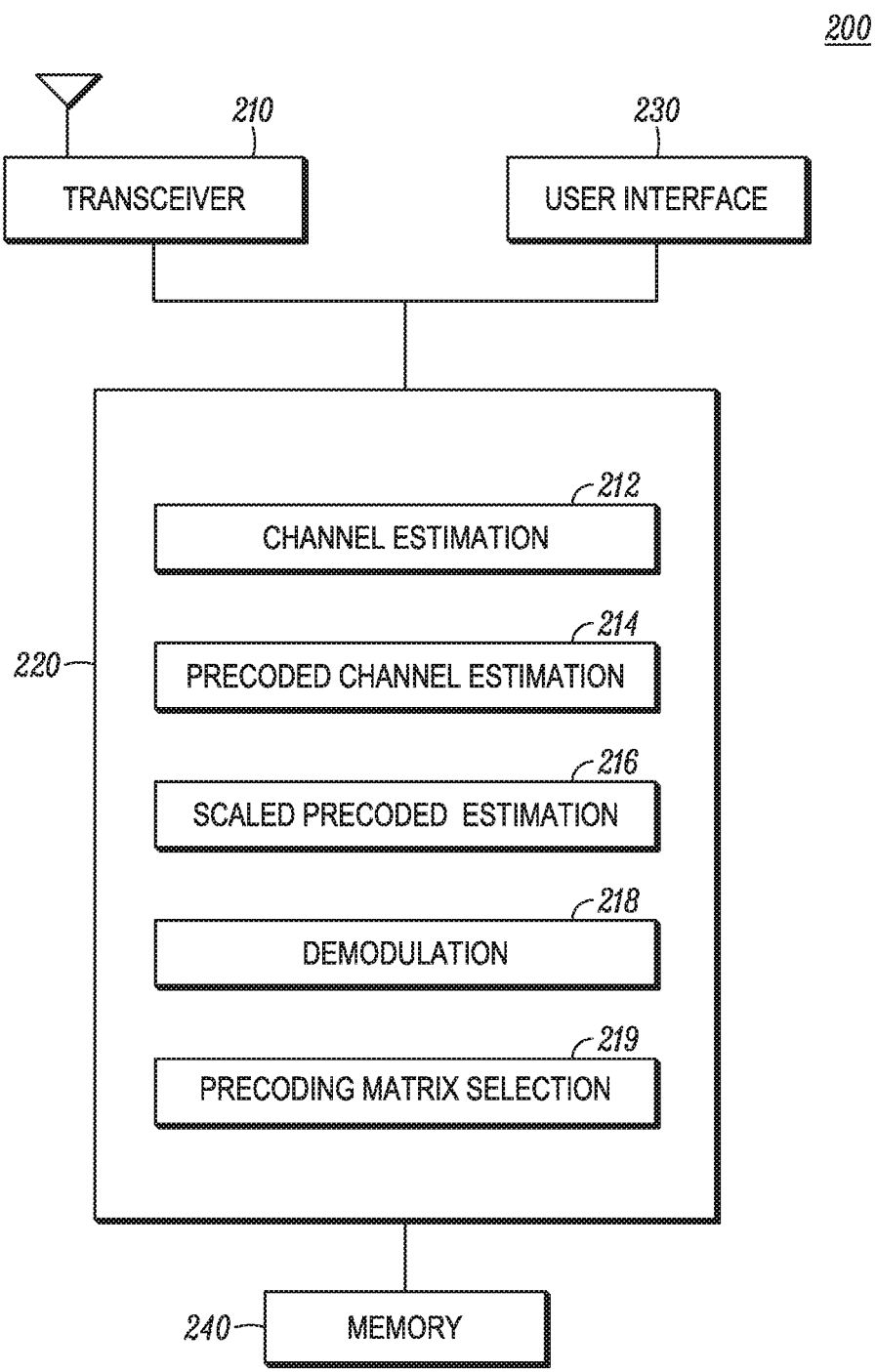
FIG. 2 illustrates a schematic block diagram of a wireless communication device according to a possible embodiment.

FIG. 2 illustrates a wireless communication terminal or device 200 comprising a transceiver 210 communicably coupled to a controller 220 according to a possible embodiment. The device 200 implements a wireless communication protocols, as discussed above, and may be capable of conducting circuit or packet switched communications or both. The device 200 may also comprise a user interface 230 for performing other functionality typically associated with wireless communication terminals, including but not limited to a keypad or other input device, a display, audio inputs and outputs among other user interface devices. These and other elements of such terminals are well known to those of ordinary skill in the art and are not described further herein. In one embodiment, the controller 220 is implemented as a digital processor that executes instruction stored in one or more memory devices 240 to perform the functionality described herein. Alternatively, the controller 220 may be implemented as an equivalent hardware circuit or as a combination of hardware and software circuits.

Figure 3:
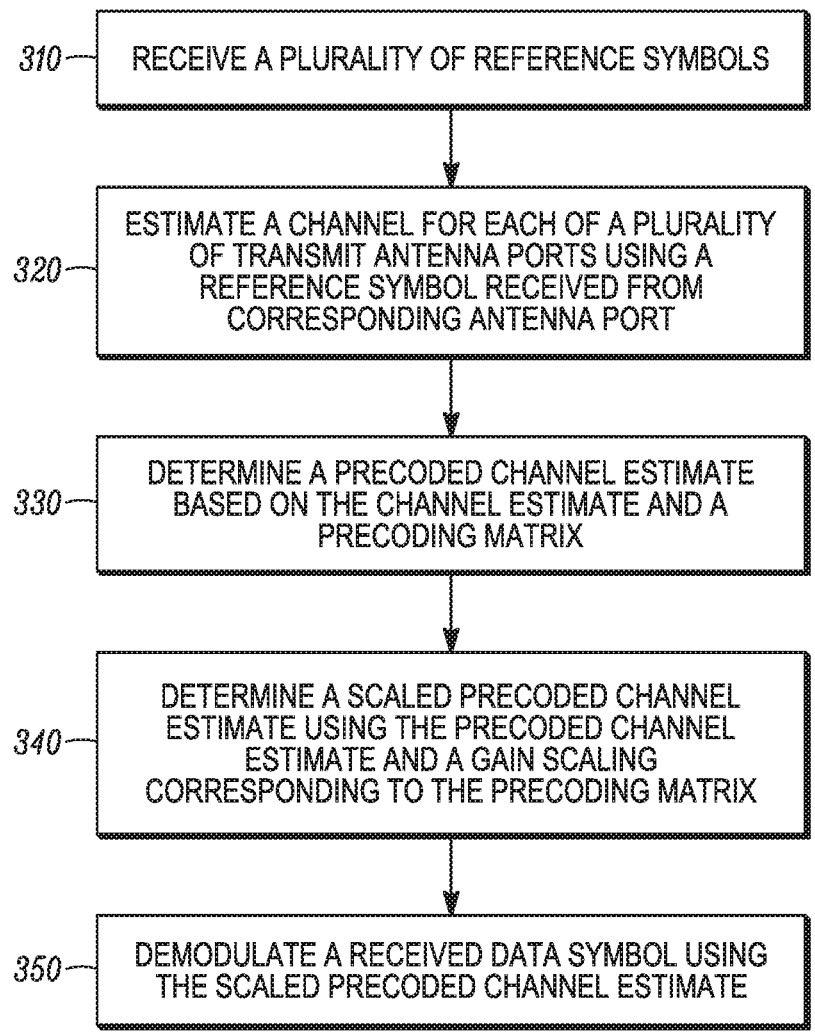
FIG. 3 is a flow diagram for a process implemented on a wireless communication device according to a possible embodiment.
Figure 4:
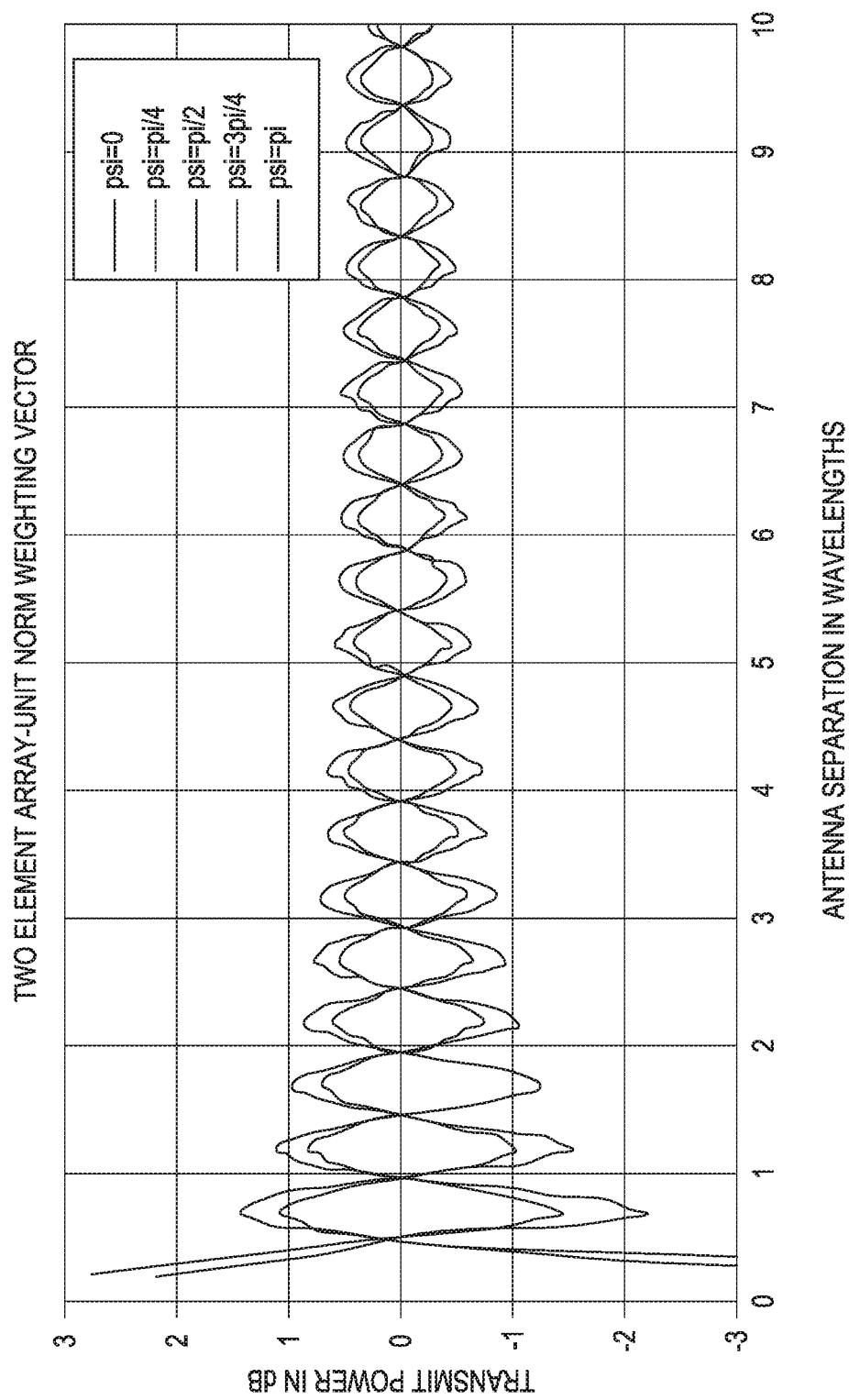
FIG. 4 is a plot of transmit power vs. antenna separation for unit norm weighting vector according to a possible embodiment.

In the process diagram 300 of FIG. 3, at 310 a wireless communication device receives a plurality of reference symbols. The wireless communication device may be a base unit or a remote unit. In 3GPP UMTS LTE parlance, the wireless communication device is an eNB or a UE. In FIG. 2, the transceiver 210 of the wireless communication device receives signals including reference symbols under control of the processor 220.

In FIG. 3 at 320, the wireless communication device estimates a channel for each of a plurality of transmit antenna ports, of a transmitting device, using a reference symbol received from the corresponding antenna port. In FIG. 2, the processor includes channel estimation functionality 212 that is implemented by executing firmware or software instructions stored in memory. Alternatively, the channel estimation functionality may be implemented by equivalent hardware circuits or by a combination of hardware and software.

In FIG. 3 at 330 the wireless communication device determines an estimate of the precoded channel based on the channels estimated using the reference symbols and based on a precoding matrix, where the precoded channel is defined as the channel that results for a symbol for which the precoder is applied at the transmitter. In one embodiment, the wireless communication device determines the precoded channel estimate for a symbol that is transmitted from the plurality of transmit antenna ports of the device from which the reference symbols were received, wherein the data symbol is weighted at each transmit antenna port by a corresponding precoding weight obtained from the precoding matrix. Alternatively, the precoded channel estimate need not be determined for a transmitted data symbol. In FIG. 2, the processor of the wireless communication device includes precoded channel estimation functionality 214 that is implemented by executing firmware or software instructions stored in memory. Alternatively, the precoded channel estimation functionality may be implemented by equivalent hardware circuits or by a combination of hardware and software.

In FIG. 3 at 340 the wireless communication device determines an scaled precoded channel estimate using the precoded channel estimate and a gain scaling corresponding to the precoding matrix. In FIG. 2, the processor includes scaled precoded channel estimation functionality 216 that is implemented by executing firmware or software instructions stored in memory. Alternatively, the scaled precoded channel estimation functionality may be implemented by equivalent hardware circuits or by a combination of hardware and software.

In one embodiment, the wireless communication device obtains the gain scaling from a message received from another wireless communication device. In one embodiment, for example, a base unit or a EUTRA eNB signals a gain scaling for at least one precoding matrix in a downlink (DL) message. In 3GPP, the message could be a Master Information Block (MIB), or a System Information Block (SIB), or a unicast transmission. In other protocol implementations, the gain scaling may be signalled to the wireless communication device in some other message.

In another embodiment, the wireless communication device computes the gain scaling. For example, the wireless communication device computes the gain scaling based on information obtained or computed from matrix information included in a message received from another entity. In 3GPP LTE, the message in which the matrix is conveyed could be a Master Information Block (MIB), or a System Information Block (SIB), or a unicast transmission. In other protocol implementations, the gain scaling may be signalled to the wireless communication device in some other message. In another embodiment, the wireless communication device computes the gain scaling based on a ratio of an amplitude of a symbol received at the wireless communication device and an amplitude of the precoded channel estimate, wherein the symbol received at the wireless communication device is transmitted using the precoding matrix. In FIG. 2, the processor includes gain scaling computation functionality 217 that is implemented by executing firmware or software instructions stored in memory. Alternatively, the scaled precoded channel estimation functionality may be implemented by equivalent hardware circuits or by a combination of hardware and software. Computation of the gain scaling is described further below.

In FIG. 3 at 350, the wireless communication device demodulates a data symbol using the scaled precoded channel estimate. The data symbol is received from the plurality of transmit antenna ports, wherein the received data symbol having been weighted at each transmit antenna port by the corresponding precoding weight obtained from the precoding matrix. In FIG. 2, the processor of the wireless communication device includes demodulation functionality 218 that is implemented by executing software or firmware instructions stored in memory. Alternatively, the demodulation functionality may be implemented by equivalent hardware circuits or by a combination of hardware and software.

In another embodiment, the wireless communication device transmits a precoding matrix indicator (PMI) associated with the selected precoding matrix to a receiving entity. According to this embodiment, the wireless communication device first determines a plurality of precoded channel estimates for a corresponding plurality of precoding matrices in a codebook stored on the device, wherein each of the plurality of precoded channel estimates is based on a corresponding precoding matrix. A scaled precoded channel estimate for each of the plurality of precoded channel estimates is determined using the corresponding precoded channel estimate and using a corresponding gain scaling. Thereafter, the wireless communication device selects a precoding matrix from the codebook for a future transmission, wherein the selection is based on a property of the scaled precoded channel estimates. In FIG. 2, the processor of the wireless communication device includes precoding matrix selection functionality 219 that is implemented by executing software or firmware instructions stored in memory. Alternatively, the demodulation functionality may be implemented by equivalent hardware circuits or by a combination of hardware and software. The wireless communication device then transmits the PMI associated with the selected precoding matrix to the receiving entity.

In another embodiment, the wireless communication device selects a precoding matrix for a future transmission, wherein the selection is based on a property of the scaled precoded channel estimate. Thereafter, the wireless communication device determines a channel quality indication or metric (CQI) based on a scaled precoded channel estimate corresponding to a selected precoding matrix. The channel quality indication could be transport block size, a rank indication or some other metric indicative of channel quality. According to this embodiment, the wireless communication device transmits the precoding matrix, or the index of the precoding matrix, and the channel quality metric on an uplink channel The gain scaling can be characterized as a ratio of the amplitude of the precoded channel for a data symbol transmitted using a particular PMI and for which a precoder-dependent gain scaling is applied (so that all precoders yield equal energy precoded channels) to the amplitude of the precoded channel estimate resulting from application of the same PMI to the per antenna port channel estimates. If a reference symbol whose amplitude relative to the CRS reference symbols is known is transmitted with a weighting corresponding to a particular PMI matrix, the UE can estimate the gain scaling as the ratio of the amplitude of the received reference symbol to the amplitude of the precoded channel corresponding to the same PMI matrix. The gain scaling needed for each PMI to yield a precoded channel with the same energy can be computed at the eNB if the matrix Q defined in Equation (13) below is known. Similarly, the gain scaling for each PMI can be computed at the UE if the matrix Q in Equation (13) is known to the UE. The gain scaling needed for each precoder to yield a precoded channel with the same energy can be expressed quantitatively by Equation (14) below.

Alternative methods for providing more accurate antenna array normalization information to a wireless communication device are described further below. In the discussion, normalization is performed at a base unit, for example at a EUTRA eNB, which provides the gain scaling to a UE. More generally however, the normalization may be performed at the UE or any wireless communication device with a MIMO antenna array. In a first embodiment, a transmit antenna array is characterized by a Hermitian matrix Q of size equal to a dimension of the array. As this matrix is Hermitian, it is sufficient to provide the UE with only the upper diagonal or lower diagonal values of the complex matrix. This matrix is used to perform the pattern normalization necessary to compute a complex channel gain for each PMI. In a second embodiment, the UE is provided directly with a real-valued gain for each PMI vector. The Hermitian Q matrix is only a function of the transmitter antenna array and the circuits used to implement the precoders and thus the Hermitian Q matrix is common to all UEs served by that array. As a result, the information can be sent over common channels such as the MIB or SIB. Alternatively, this information can be sent over dedicated channels. Similarly, PMI scaling values are only a function of the PMI matrix and not of the UE served by the array. As a result, the PMI correction values can be sent over common channels such as the MIB or SIB. Alternatively, this information can be sent over dedicated channels.

If the antenna array is calibrated, then the Q matrix and the PMI gain scaling values will be time-invariant. As a result, these values can be computed only once. Conversely, if the antenna array is not calibrated so that the relative phases of the antenna feeds change over time, then the Q matrix calculation and the PMI correction values must be periodically recalculated and/or re-measured. Calculation of the Q matrix can be done using an antenna chamber.

The calculation of transmit power for a 2-element array is described below. Consider a 2-element array in which each of the two array elements is an omni-directional antenna. For this example, it is assumed that the omni-directional antenna radiates only in the plane, so that $$p(\varphi, \theta) = \begin{cases} \frac{1}{\sqrt{2\pi}} & \varphi = 0, 0 \leq \theta < 2\pi \\ 0 & \varphi \neq 0 \end{cases} \quad (1)$$

where $p(\varphi, \theta)$ denotes the element pattern, and $\varphi$ ($(-\pi/2 \leq \varphi \leq \pi/2)$ and $\theta$ $(0 \leq \theta \leq 2\pi)$ denote the antenna elevation and azimuth, respectively. Note that the omni-directional element is scaled such that it radiates unit power in the plane.

Let $w_0$ and $w_1$ denote the weighting coefficients applied to the first and second antenna elements, respectively, and let $d \cdot \lambda$ denote the spacing of the two elements, where $\lambda$ denotes the signal wavelength. The resulting far-field array pattern as a function of azimuth is then given by $$a_w(\theta) = \frac{1}{\sqrt{2\pi}} \left( w_0 + w_1 e^{-j\frac{2\pi}{\lambda}(d\lambda)\sin\theta} \right) \quad (2)$$

$$= \frac{1}{\sqrt{2\pi}} (w_0 + w_1 e^{-j2\pi d \sin\theta})$$

In the 3GPP model, it is assumed that the power radiated from the array in Equation (2) is equal for all weighting vectors w for which the square of the $L_2$ norm $\|w\|^2 = |w_1|^2 + |w_2|^2$ is held constant (or equivalently, so long as the $L_2$ norm is held constant). However, this assumption can be shown to be false with a simple counterexample. Specifically, for this simple two element example, it will be shown that we can select any number of pairs of weighting vectors w and v such that $\|w\|^2 = \|v\|^2$ and yet the resulting antenna patterns do not radiate equal power.

The power radiated from an antenna is equal to the integral of the square of the magnitude of the far field antenna pattern, so that the radiated power is given by $$\int_0^{2\pi} \|a_w(\theta)\|^2 d\theta, \quad (3)$$

where in this example, it is only necessary to integrate over the azimuth $\theta$ as the element pattern $p(\varphi, \theta)$ has been defined such that it radiates only in the plane. More generally, it would be necessary to integrate also over the elevation angle $\varphi$. The example can be simplified further if, in addition to the requirement that $\|w\|^2 = 1$, we further require that the complex weights $w_0$ and $w_1$ have equal magnitude so that $|w_0| = |w_1| = 1/\sqrt{2}$. Without further loss of generality, we then have that $w_0 = 1/\sqrt{2}$ $w_1 = e^{j\psi}/\sqrt{2}$ \quad (4)

so that $\|w\|^2 = 1$, regardless of the phase difference $\psi$. With these complex weights, the antenna pattern is given by $$a_w(\theta) = \frac{1}{2\sqrt{\pi}} (1 + e^{-j(\psi + 2\pi d \sin\theta)}), \quad (5)$$

and the transmitted power is given by $$\int_0^{2\pi} |a_w(\theta)|^2 d\theta = \int_0^{2\pi} \frac{1}{4\pi} |1 + e^{-j(\psi + 2\pi d \sin\theta)}|^2 d\theta \quad (6)$$

$$= \frac{1}{4\pi} \int_0^{2\pi} (2 + 2\cos(\psi + 2\pi d \sin\theta)) d\theta$$

$$= 1 + \frac{1}{4\pi} \int_0^{2\pi} 2(\cos(\psi)\cos(2\pi d \sin\theta) - \sin(\psi)\sin(2\pi d \sin\theta)) d\theta$$

$$= 1 + \frac{1}{4\pi} \int_0^{2\pi} 2\cos(\psi)\cos(2\pi d \sin\theta) d\theta$$

where the term $\sin(\psi)\sin(2\pi d \sin\theta)$ is dropped in the last step as it is an odd function of $\theta$ and thus integrates to 0 over the interval $[0, 2\pi)$. The radiated power as calculated in Equation (6) is given in dB as a function of the antenna separation d in wavelengths for several different values of the phase difference $\psi$ between the two elements. As the antenna separation goes to zero, the radiated power varies from a maximum of 2 (3 dB) to a minimum of 0 (-infinite dB) in spite of the fact that in all cases $\|w\|^2 = 1$.

Two other observations can be made from this two-element example. First, with an antenna separation of one-half wavelength, the radiated power varies from −1.58 dB ($\psi=0$) to 1.15 dB ($\psi=\pi$). Thus, the power can vary by 2.73 dB as a function of the antenna phase difference, even while the norm of the weighting vector is held constant (could be slightly more if evaluated over all values of $\psi$). Second, as the antenna separation increases, the variation of power as a function of the relative phase $\psi$ decreases. Specifically, with an antenna separation equal to 9.5 $\lambda$, the radiated power varies from a minimum of −0.33 dB ($\psi=0$) to a maximum of 0.31 dB ($\psi=\pi$), so that the difference is only 0.62 dB (could be slightly more if evaluated over all values of $\psi$).

Normalization of the antenna pattern is described below. If, as is typically assumed, the input impedance of the array is constant for all values of the phase difference $\psi$, then it must follow that the power radiated from the antenna is proportional to the square of the square of the $L_2$ norm of the excitation vector. However, for coupled antenna elements, the impedance of the antenna array is a function of the relative phase of the array inputs, and so the power delivered to the array and radiated is a function of the relative phase $\psi$ and thus is not constant even though $\|w\|^2$ is held constant. As a result, it is useful to apply precoder dependent scaling in order to keep the radiated power constant. The normalized antenna pattern for the precoder w is given by $$a_{w,n}(\theta) = \frac{\|w\| \frac{1}{\sqrt{2\pi}} (w_0 + w_1 e^{-j2\pi d \sin\theta})}{\left( \int_0^{2\pi} \left| \frac{1}{\sqrt{2\pi}} (w_0 + w_1 e^{-j2\pi d \sin\phi}) \right|^2 d\phi \right)^{1/2}} \quad (7)$$

where the subscript n denotes that the pattern is normalized to have radiated power equal to $\|w\|^2$. For the normalized antenna pattern in Equation (7), the radiated power is given by $$\int_0^{2\pi} |a_{w,n}(\theta)|^2 d\theta = \int_0^{2\pi} \left| \frac{\frac{1}{\sqrt{2\pi}}(w_0 + w_1 e^{-j2\pi d \sin\theta})}{\left( \int_0^{2\pi} \left| \frac{1}{\sqrt{2\pi}}(w_0 + w_1 e^{-j2\pi d \sin\phi}) \right|^2 d\phi \right)^{1/2}} \right|^2 d\theta. \quad (8)$$

$$= \frac{\|w\|^2}{\left( \int_0^{2\pi} \left| \frac{1}{\sqrt{2\pi}}(w_0 + w_1 e^{-j2\pi d \sin\phi}) \right|^2 d\phi \right)^{1/2}}$$

$$\int_0^{2\pi} \left| \frac{1}{\sqrt{2\pi}}(w_0 + w_1 e^{-j2\pi d \sin\theta}) \right|^2 d\theta$$

$$= \|w\|^2$$

To reiterate, if the antenna pattern is normalized so that the radiated power is equal to $\|w\|^2$, then the resulting antenna array pattern is given by Equation (7) and not by Equation (2).

Scaling of the PMI-based channel estimation is described below. For several of the 3GPP transmission modes, the channel estimate for the data is generated by application of the PMI to the channel estimates for each transmit antenna port. However, the PMI-based channel estimate assumes that the far field-antenna pattern is the PMI-based linear combination of the channel estimates for the individual ports. In order for this assumption to be correct, the antenna pattern must be as given as in Equation (2), and thus is not normalized to unit energy. If the antenna pattern is normalized to $\|w\|^2$ (as assumed, but not required, in the 3GPP specification), the PMI-based channel estimate will be in error by a real-valued normalization scalar (for the two-element array, this factor is given in Equation (9) below). In order to properly compute the channel estimate, the UE must know the correct normalization scalar for each PMI. Specifically, for the two-element example in Equation (2), the normalization scalar is given by $$\left( \int_0^{2\pi} \left| \frac{1}{\sqrt{2\pi}}(w_0 + w_1 e^{-j2\pi d \sin\phi}) \right|^2 d\phi \right)^{1/2}. \quad (9)$$

For the specific example in which the precoding vector w is $$w_0 = 1/\sqrt{2}$$

$$w_1 = e^{j\psi}/\sqrt{2} \quad (10)$$

the normalization scalar is given by $$\left( \int_0^{2\pi} \left| \frac{1}{2\sqrt{\pi}}(1 + e^{-j(\psi + 2\pi d \sin\theta)}) \right|^2 \right)^{-1/2}. \quad (11)$$

Correction of PMI-based CQI estimation is described below. In order to estimate the channel quality (CQI) or channel state (CSI), it must be possible to correctly estimate the channel that results with the application of each PMI. If the patterns are normalized to equal energy, without a per-PMI gain precoder-dependent scaling at the receiver, the complex channel estimate for each PMI will have a scaling error, and this will result in an error in the calculation of the CQI. If the UE has access to the per-PMI based scaling, then the UE can correctly compute the CQI and/or CSI for each PMI. With the correct gain scaling, the UE can correctly determine the best PMI and the associated CSI/CQI.

Calculation of the Transmitted Power for General Antenna Arrays is described below. For the purposes of this analysis, consider the more general case in which in which the number of antenna elements is K. Furthermore, the array elements need not be required to have the same pattern, though typically it is assumed that this is the case. Let the complex vector $q(\theta, \phi)$ of length K denote the antenna patterns for these elements, where as before, $\phi$ ($-\pi/2 \leq \phi \leq \pi/2$) and $\theta$ ($0 \leq \theta \leq 2\pi$) denote the antenna elevation and azimuth, respectively.

If the array is driven by ideal current sources, the transmitted power is given by $$\int_0^\pi \int_0^{2\pi} |w^H q(\theta, \phi)|^2 \sin(\phi) d\theta d\phi = \quad (12)$$

$$\int_0^\pi \int_0^{2\pi} w^H q(\theta, \phi) q^H(\theta, \phi) w \sin(\phi) d\theta d\phi =$$

$$w^H \left( \int_0^\pi \int_0^{2\pi} q(\theta, \phi) q^H(\theta, \phi) \sin(\phi) d\theta d\phi \right) w = w^H Q w,$$

where the matrix Q is defined as $$Q = \int_0^\pi \int_0^{2\pi} q(\theta, \phi) q^H(\theta, \phi) \sin(\phi) d\theta d\phi. \quad (13)$$

It can be noted that the Q matrix has the following properties: the dimension of the Q matrix is K×K, where K is the number of antenna elements in the transmitter array; and from the definition of the Q matrix, it is apparent that the Q matrix is Hermitian so that $Q^H = Q$.

In general, each PMI is a matrix of dimension K×L, where K is the number of antennas (or antenna ports) in the array, and L is the number of transmission layers. We assume that the elements of the antenna array are coupled so that each vector of the PMI matrix must be scaled to satisfy the same unit energy constraint. Let w denote the precoding vector for a given transmission layer, or equivalently, let w denote any column of the PMI. It then follows that the correction factor needed for this precoding vector is given by the square-root of the inverse of the corresponding transmitted energy, or equivalently, by $$(w^H Q w)^{-1/2}, \quad (14)$$

where w is the precoding matrix Q is determined by the antenna element patterns and the spacing of the antenna elements. Thus, there is a normalization correction factor associated with each column of each PMI. These normalization factors must be sent from the eNB to the UE, or they must be learned by the UE.

Signaling of the precoder-dependent gain scaling factors to the UE is described further below. The gain normalization scaling factors for each PMI may be transmitted to the UE's in several forms. In one form, the eNB can transmit the gain normalization correction factors for each PMI to the UE. The gain normalization correction factor for each possible precoding vector must be measured and/or calculated and transmitted to the UE. Note that for a multiple layer PMI matrix, one correction factor must be sent for each layer. In most instances, different PMI matrices will have some predoding vectors in common. It is sufficient for the UE to measure and/or calculate the gain normalization for each possible precoding vector (over the union of all possible PMI's) to the UE. The gain normalization correction factors are dependent only on the PMI, and not on the UE. Thus, the gain normalization correction factors may be sent over common channels such as the MIB or SIB. Alternatively, the gain scaling factors can be sent to the UE's over dedicated channels.

In an alternative embodiment, the Q matrix is sent to the UE. With knowledge of the Q matrix, the UE can compute the gain normalization correction factors itself As noted in the previous section, the Q matrix is Hermitian, so it is only necessary to send UE either the upper triangular values or the lower triangular values of the matrix. If the transmit antenna array has K elements, then it is only necessary to send K real values and K×(K−1)/2 complex values (equivalently, a total of $K^2$ real values) to the UE in order for the UE to be able to compute the gain scaling values. Depending on the number of antennas and the number of PMI matrices, in some cases it will be more efficient to send a gain scaling for each PMI matrix, while in other cases it will be more efficient to send the values of the Q matrix.

The precoder-dependent gain scaling factors must be estimated or measured. In some cases, it may be possible to measure the Q matrix for the antenna array in an antenna chamber. Conversely, it may be possible to measure the patterns $q(\theta, \phi)$ of the individual elements of the array separately. If the phase difference between the antenna feeds is known or can be measured, then the Q matrix can be computed using numerical integration.

If the relative phase of the antenna feeds changes rapidly, the estimates of the gain scaling factors may be obsolete before they can be applied. In particular, the gain scalings factors used for PMI/CQI selection may be obsolete before they can be used, as calculation of the PMI/CQI feedback requires gain normalization correction estimates for all PMI's, but the UE can only estimate the gain normalization correction for the PMI used for the current subframe.

The following description is directed to additional embodiments that are supported by, but not limited to the above embodiments.

Figure 5:
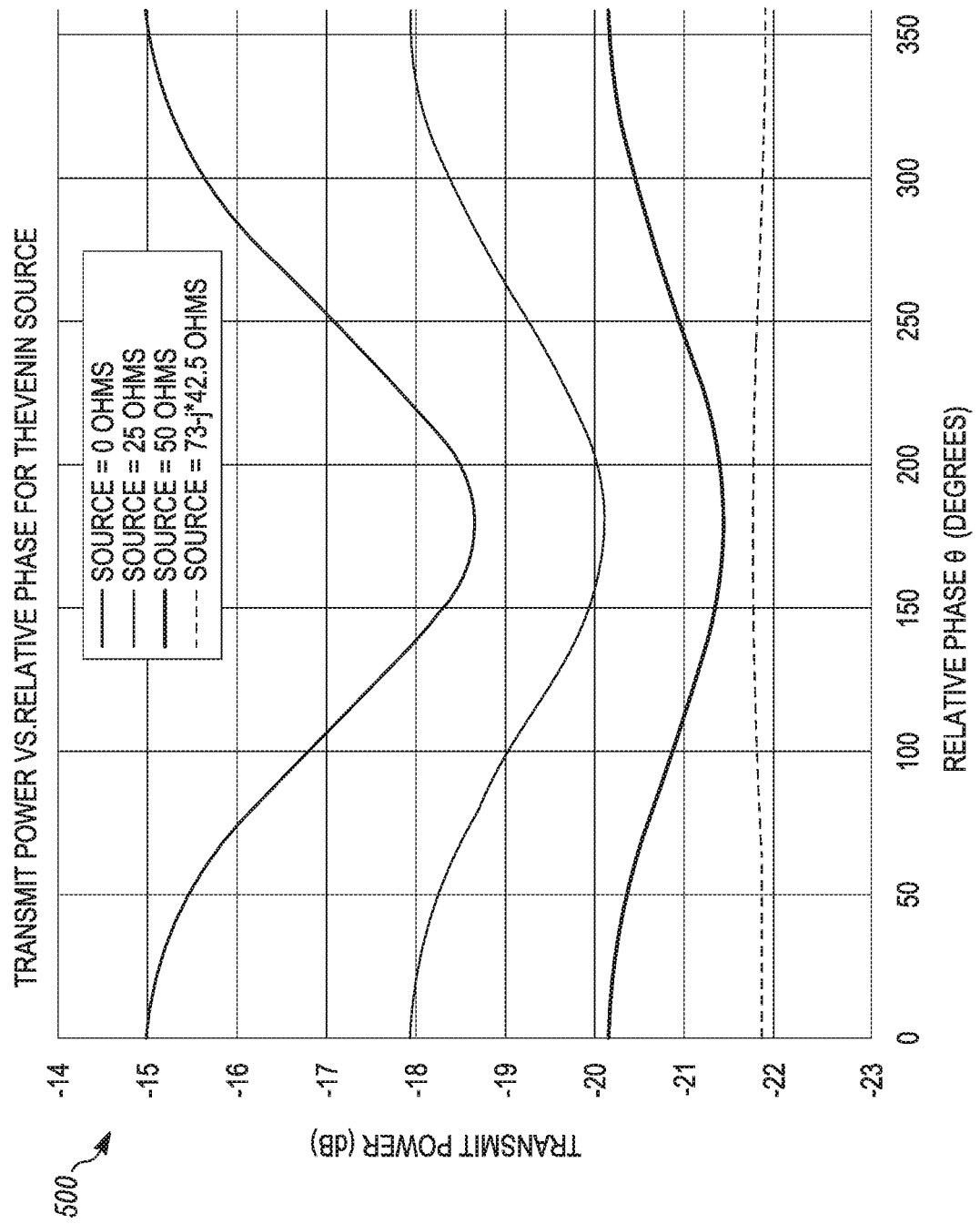
FIG. 5 is an example graph of transmitter radiated power vs. relative phase offset for a Thevenin source model for a two element array consisting of two half-wavelength dipoles separated by one-half of a wavelength according to a possible embodiment.
Figure 6:
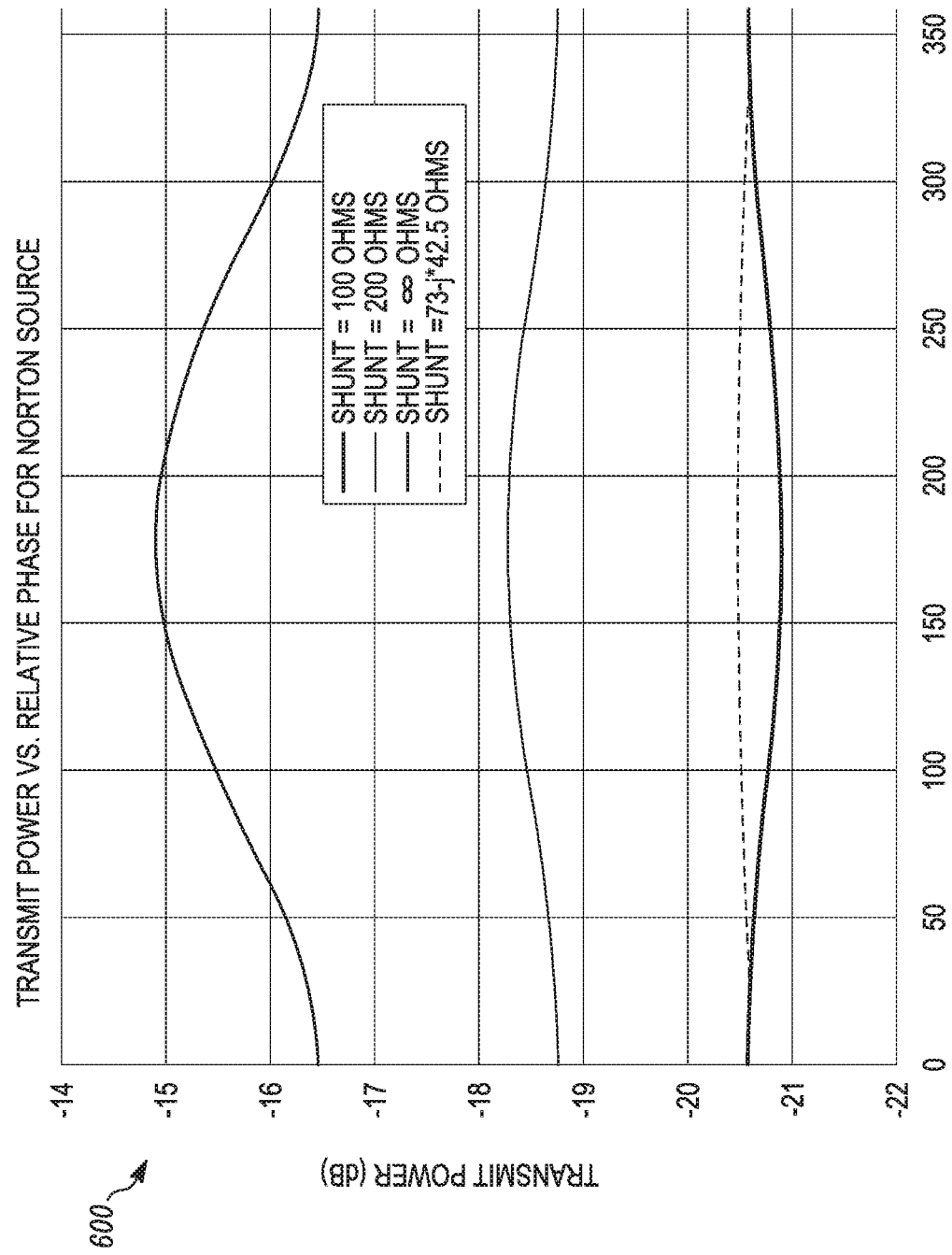
FIG. 6 is an example graph of transmitter radiated power vs. relative phase offset for a Norton source model for a two element array consisting of two half-wavelength dipoles separated by one-half of a wavelength according to a possible embodiment.

FIG. 5 is an example graph 500 of transmitter radiated power vs. relative phase offset for a Thevenin source model for a two element array consisting of two half-wavelength dipoles separated by one-half of a wavelength according to a possible embodiment. FIG. 6 is an example graph 600 of transmitter radiated power vs. relative phase offset for a Norton source model for a two element array consisting of two half-wavelength dipoles separated by one-half of a wavelength according to a possible embodiment. In both of these examples the precoder w has the form $$w = [\, w_1 \quad w_2 \,]^T \hspace{2cm} (15)$$
$$= \frac{1}{\sqrt{2}} [\, 1 \quad \exp(j\theta) \,]^T,$$

where $\theta$ is specified in radians so that $0 \leq \theta < 2\pi$. In the graph 500, the variation of the transmit power is shown as a function of the relative phase $\theta$ and the source impedance $Z_S$ for the case in which each element of the array is driven by a Thevenin source (an ideal voltage source in series with a source impedance). In the graph 600, the variation of the transmit power is shown as a function of the relative phase $\theta$ and the source impedance $Z_S$ for the case in which each element of the array is driven by a Norton source (an ideal current source in parallel with a shunt source impedance). For the Thevenin source model in the graph 500, the variation of the transmit power over phase $\theta$ is 3.6 dB when the series source impedance is 0. For the Norton source model in the graph 600, the variation of the transmit power over the phase $\theta$ is 1.5 dB over the unit energy precoder when the parallel shunt impedance is infinite In both cases, this power variation occurs even though the Frobenius norm of the precoder w is held constant at unity.

Due to the large transmit power variation that can occur over this unit energy codebook, the precoder selection performed at the receiver can no longer be assumed to be optimal, since each precoder corresponds to a different transmit power. A fair comparison of the precoders must account for this difference in transmit power. This problem can be addressed using the following embodiments.

A possible embodiment does not use precoder-dependent scaling at the transmitter, such as a transmitting device and/or a transmitter at a transmitting device. The transmitter can measure or otherwise learn the transmit power delta for each precoder relative to a reference precoder within the set of precoders. The transmitter can signal the reference precoder and the power difference for each of the precoders to the receiver, such as a receiving device and/or a receiver at a receiving device. The receiver then can compute two channel quality metrics. The first channel quality metric, such as the SINR, Mean Mutual Information per coded Bit (MMIB), or other throughput estimate, is calculated as before. This metric is the channel quality to be signaled to the transmitter in the event that the precoder is selected as the best. The second channel quality metric is computed using the power delta for the given precoder. In particular, the estimate of the channel between each transmit antenna and the receiver is scaled by the square root of the power difference for the precoder. The scaled channel estimates are then used to compute the second channel quality metric for the precoder.

After the second channel quality metric has been computed for each of the precoders, these second channel quality metrics are compared. The index of the precoder with the largest second channel quality metric is signaled to the transmitter as the best precoder. Additionally, the first channel quality metric for this same precoder is also signaled to the transmitter to indicate the modulation and coding rate that should be used for the indicated transmission.

Another possible embodiment can use precoder-dependent scaling at the transmitter. In the same manner as for the previous embodiment, the transmitter can measure or otherwise learn the transmit power difference for each precoder relative to a reference precoder within the set of precoders. After learning these power differences, the transmitter applies a precoder-dependent scaling at the transmitter so that the equal power is transmitted with each scaled precoder. It can be noted that the power difference, and thus the required scaling, is a function of many factors including both the mutual coupling between the antenna elements and the circuitry used to drive the antenna elements.

In order to form a channel quality estimate for each precoder, the receiver can first form an estimate of the channel between each transmit antenna element and the receiver using reference symbols transmitted from each antenna element. The receiver then forms an estimate of the channel corresponding to each precoding vector by computing the inner product of the precoding vector and the conjugate of the per-antenna channel estimates. For multi-layer transmissions, the precoding vector for each layer is scaled independently of the other layers. In the absence of precoder scaling, the receiver computes the channel quality metric for each precoder using the channel estimate resulting from the inner product. However, if precoder scaling is used to equalize the transmit power over the precoders, then the receiver can scale the channel estimate resulting from the inner product of the precoding vector and the conjugate of the per-antenna element channel estimates by the scaling factor for the given precoder. This scaled channel estimate is then used to determine the channel quality metric for the given precoder.

The precoder-dependent scaling can also have an impact on demodulation depending on whether or not demodulation reference symbols are included with the data. If demodulation reference symbols are used, then the same precoder-dependent scaling used for the data symbols should also be used when precoding the demodulation reference symbols. With this precoder-dependent scaling, the channel estimates formed using the demodulation reference symbols can be used to to demodulate the data, since the channel between the transmitter and the receiver is the same for the data symbols as for the demodulation reference symbols.

If demodulation reference symbols are not used, then the situation is the same as for the compution of the channel quality metric. In particular, the channel estimate for demodulation is computed by first forming an estimate of the channel between each transmit element and the receiver using the reference symbols transmitted from each antenna element. Then, the inner product of the precoder used to transmit the data (the precoder is signaled from the transmitter to the receiver over a control channel) and the conjugate of the per antenna channel estimates can be computed to form an estimate of the channel for the data. Then, the precoder-dependent scale factor can be multiplied by this channel estimate. Then, the data can be demodulated using this precoder-dependent scale factor multiplied channel estimate.

If demodulation reference symbols are included in the data, it is possible for the receiver to learn the precoder-dependent scale factors applied at the transmitter. In particular, this can be done by comparing the channel estimate for the demodulation reference symbols with the channel estimate that results from taking the inner product of the precoder and the conjugate of the per-antenna channel estimates. The ratio of these two channel estimates (the ratio of the channel estimates for each layer for multi-layer transmissions) is then used to infer the precoder-dependent scaling applied at the transmitter. This precoder-dependent scaling is then then used to scale the inner product of the precoding vector and the conjugate of the per-antenna channel estimates prior to computing the channel quality metric for the precoder. Thus, for each precoder, the precoder-dependent scale factor is used to scale the channel estimate used to estimate the channel quality.

There are several factors that can be considered in regards to this approach in which the precoder-dependent scale factor is infered from the ratio of the channel estimate for the demodulation reference symbol and the channel estimate resulting from computing the inner product of the precoding vector and the conjugate of the per-antenna channel estimates. One factor is that the receiver estimates of the precoder dependent scale factors may be quite noisy. Another factor is that the receiver may not estimate the precoder dependent scale factor for a particular precoder until that precoder is used to transmit data. Thus, initial estimates of the channel quality metric for a particular precoder may not be scaled by the estimate of the precoder-dependent scale factor until some period of calibration is completed. Another factor is that the precoder-dependent scale factors may change over time, especially if the phase relationship of the oscillators used for the different antenna elements change over time. The scale factors can also change if the antenna coupling changes over time as can occur in the UE transceiver if the UE is used as the transmitter and the UE hand placement changes or the position of the UE relative to the head or body changes.

In cases where the number of precoders is much larger than the square of the number of transmit antennas, there are useful ways by which the receiver can estimate the precoder dependent scaling than by taking one measurement per precoder. In particular, in the case that the antenna elements are driven by Thevenin sources or Norton sources, the radiated power can be written in the following form $$P_T(w) = w^H Q w, \qquad (16)$$

where the matrix Q is Hermitian and positive definite, and has size M×M where M is the number of transmit antennas. It can be shown that coefficients of the matrix Q can be uniquely characterized using only $M^2$ measurements. Furthermore, because Q is Hermitian, it can be uniquely represented using $M^2$ real-valued coefficients. Thus, if the number of precoders is larger than $M^2$, it is more efficient to take the measurements used to characterize the matrix Q than to take one measurement per precoder. That the matrix Q is not only a function of the antenna array; rather it is a function of the antenna array, the circuitry used to drive the antenna array (including source impedances), impedance matching networks, and the physical environment of the array.

It can be noted that in some cases, the matrix Q is both Hermitian and real. In this circumstance, the coefficients of Q can be uniquely reprsented using only $M^2/2+M2$ real-valued coefficients.

If demodulation reference symbols are not included in the data, then the receiver may not determine the precoder-dependent scaling applied at the transmitter. In this case, the precoder-dependent scaling used at the transmitter can be signaled from the transmitter to the receiver.

For evaluation of the precoder dependent power variation at the transmitter, it is a non-trivial matter to determine dependence of the transmit power on the precoder that is used. However, there are some options that can be considered. One option is to take measurements in an antenna chamber. For example, the radiated power as a function of the precoder can be measured in an antenna chamber. A second alternative is to use a network analyzer to measure the scatting parameters for the antenna array. The scattering parameters can be used to compute the impedance matrix and also to compute the power delivered to the array (and thus radiated) as a function of the precoder. However, these methods have factors that can be considered. One factor is cost. For example, it may not be feasible to take per Precoding Matrix Indicator (PMI) measurements on every UE. If the mapping from precoder to transmit power is the same for all UE's, the perhaps it is feasible to take such measurements on a percentage of the UE's. However, there may be significant variation of the mapping over time and temperature, especially since the mapping will depend on the difference in the phase length of the signal path between the transceiver and the antennas, including any difference in the oscillator phase between the two antennas. Another factor is variation of the mapping between the precoders and the transmit power over multiple variables, such as time, temperature, and variation of self-impedance, mutual coupling, and matching efficiency as a function of head, hand, and body position relative to the device. Antenna chamber measurements may be feasible for eNB's, though even this may take extra cost and time.

Another option to determine dependence of the transmit power on the precoder that is used is to take periodic measurements internally to the device. For example, Voltage Standing Wave Ratio (VSWR) on the transmission lines between the power amplifier and the antenna can be measured. The VSWR indicates the fraction of the power reflected from the antenna port since VSWR is defined as $$VSWR = \frac{V_0^+ + V_0^-}{V_0^+ - V_0^-}. \tag{17}$$

As another example, the power into the return matched load of the isolator can be measured. The radiated power for a given PMI can be calculated as the power delivered to the circulator less the power into the return matched load of the isolator. As another example, a directional coupler can measure the power delivered to the load as a function of the precoder. As another example, the s-parameters of the antenna subsystem can be measured. The s-parameters for the antenna subsystem can be measured by measuring the power returned from the all of the antenna ports when the antenna ports are driven one at a time. Directional couplers can be used for these measurements.

The precoder dependent transmit power variation can depend on frequency. Depending on the bandwidth of a particular frequency band, more than one measurement may be required per band. For smaller bandwidths, a single measurement may be sufficient. A combination of measurements and calculations may be used to compute the precoder transmit power variation. In particular, if the s-parameters or the z-parameters (impedance matrix) for the antenna subsystem are characterized via measurements, this information can be combined with information about the source used to drive the antenna subsystem (e.g., is the antenna subsystem driven by a voltage source with series impedance (Thevenin source), by a current source with shunt impedance (Norton source), or other) to compute the precoder transmit power variation. The following examples indicate how to compute the Q matrix given above as a function of the impedance parameters and the admittance parameters for both Thevenin and Norton source types. Note from above that $$P_T(w) = w^H Q w. \tag{18}$$

If we assume that in-device measurements can be used to extract the admittance matrix S for the antenna subsystem, then the impedance matrix is given by $Z = S^{-1}$. If Thevenin sources are used to drive the antenna subsystem, and the series impedances are given by $$Z_S = \begin{bmatrix} Z_{S1} & 0 \\ 0 & Z_{S2} \end{bmatrix}, \tag{19}$$

then the matrix Q is given by $$Q = (Z_S + Z)^{-H} \left( \frac{Z + Z^H}{2} \right) (Z_S + Z)^{-1} \tag{20}$$

If Norton sources are used to drive the antenna subsystem and the shunt impedances are again given by $$Z_S = \begin{bmatrix} Z_{S1} & 0 \\ 0 & Z_{S2} \end{bmatrix}, \tag{21}$$

then the matrix Q is given by $$Q = Z_S^H (Z_S + Z)^{-H} \left( \frac{Z + Z^H}{2} \right) (Z_S + Z)^{-1} Z_S. \tag{22}$$

Figure 7:
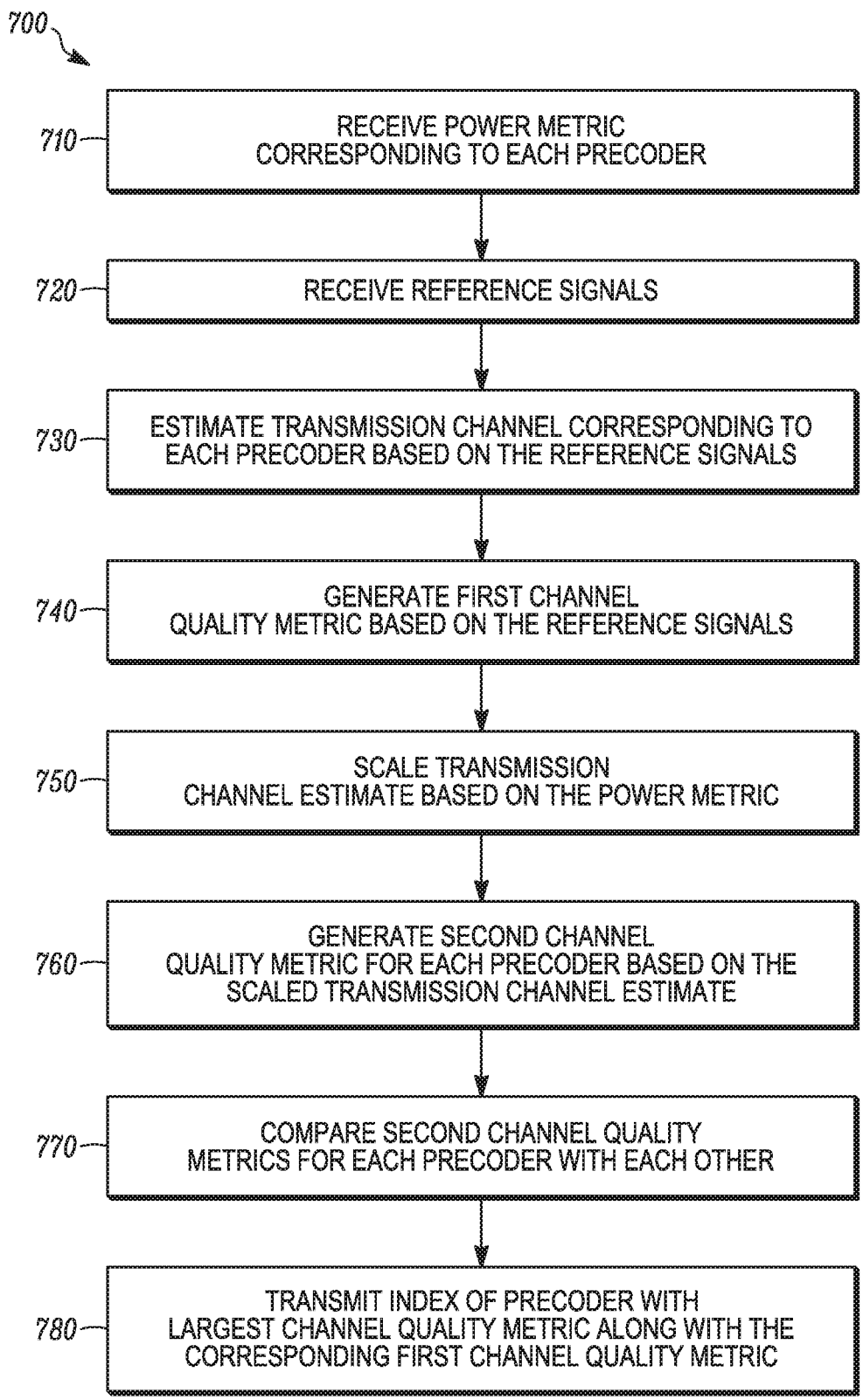
FIG. 7 is an example flowchart illustrating operation of a receiving device according to a possible embodiment.

FIG. 7 is an example flowchart 700 illustrating operation of a receiver and/or receiving device, such as the units 101, 102, 103 and/or 104 according to a possible embodiment. At 710, a power metric corresponding to each precoder of a plurality of precoders can be received. The power metric can be an estimated radiated power of each precoder of the plurality of precoders. The precoder radiated power can be a total radiated power for each precoder or a difference in power for each precoder relative to a reference precoder power. The power metric can also be an estimated difference in power of each of a plurality of precoders from a reference precoder power. The estimated difference in power can be a based on a difference in transmitted power, a difference in radiated power, or any other difference in power between a reference precoder and another precoder. The reference precoder can be received or can be already known, information about the reference precoder can be received or known, and/or any other method can be used to determine the reference precoder to determine an estimated difference in power between the reference precoder and another precoder. For cases in which battery life must be maximized and system interference is a secondary concern, the power metric may reflect the total power associated with a precoder, both radiated as well as that dissipated within the transmitter. The power dissipated within the device may include the power dissipated within the source impedance of the transmitter, the power reflected back from the antenna array, and the power dissipated due to ohmic heating within the array. Also, as some precoders can be associated with more antenna elements, and thus more power amplifiers, than others, the power dissipation associated with the precoder may also reflect the power and bias currents associated with enabling and properly setting the operating point of the power amplifier.

At 720, reference signals can be received. At 730, a transmission channel corresponding to each precoder based on the reference signals can be estimated. The transmission channel can correspond to a precoder by being a function of the precoder being used. The transmission channel estimate can be the inner product of the precoder and the conjugate of the per-antenna element or per-port channel estimates. At 740, according to a possible implementation a first channel quality metric can be generated based on the reference signals.

At 750, the estimate of the transmission channel can be scaled based on the power metric for each precoder. Scaling can include multiplying the transmission channel estimate by the scaling factor, dividing the transmission channel by the scaling factor, or otherwise applying the scaling factor to the transmission channel estimate. The power metric can be based on a square root of the estimated difference in power of each precoder of the plurality of precoders, such as when scaling is dividing, or the inverse of the square root of the estimated difference in power of each precoder of the plurality of precoders, such as when scaling is multiplying.

The square root of the difference in power of each precoder of the plurality of precoders can be a scaling factor.

At 760, a second channel quality metric for each precoder can be generated based on the scaled estimate of the transmission channel The second channel quality metric can be determined before, after, or concurrently with determining the first channel quality metric. The second channel quality metric can be a Signal-to-Interference-plus-Noise Ratio (SINR), a Mean Mutual Information per Bit (MMIB), an Exponential Effective SINR Metric (EESM), a channel capacity, a throughput estimate, and/or any other channel quality metric.

At 770, the second channel quality metrics for each precoder can be compared with each other to determine a precoder with a largest second channel quality metric. At 780, an index of a precoder with the largest second channel quality metric can be transmitted along with the first channel quality metric for the precoder with the largest second channel quality metric.

Figure 8:
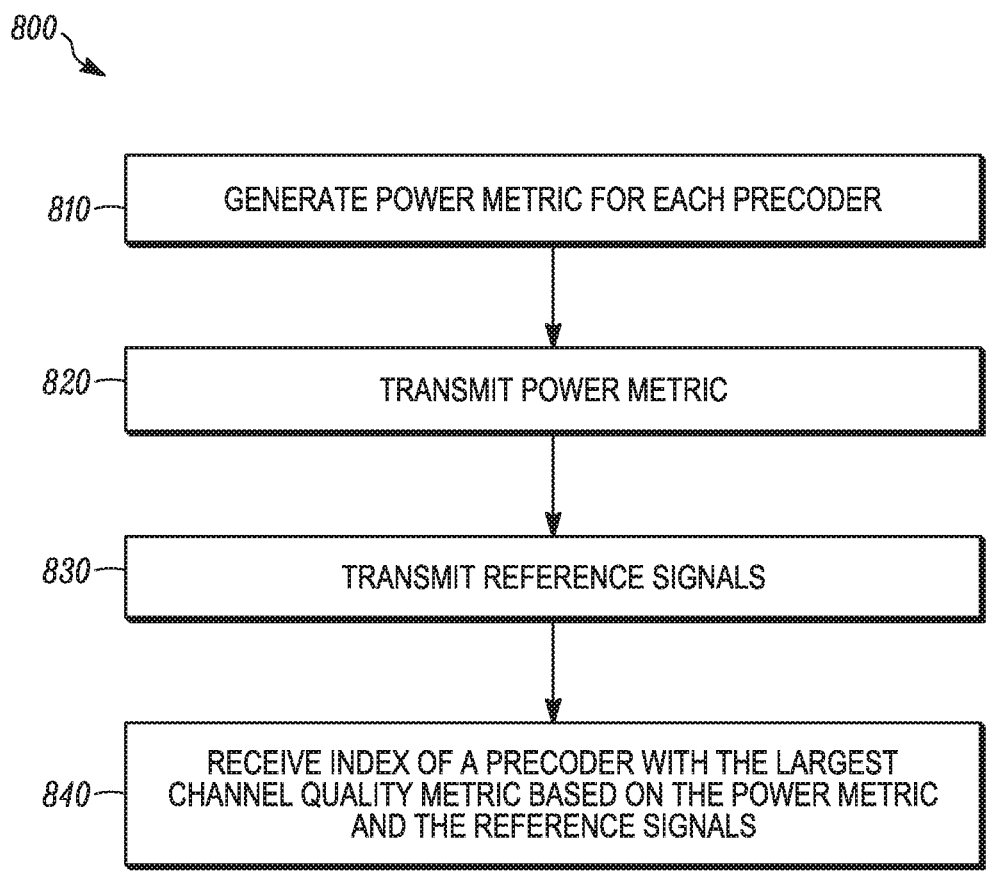
FIG. 8 is an example flowchart illustrating operation of a transmitting device according to a possible embodiment.

FIG. 8 is an example flowchart 800 illustrating operation of a transmitter and/or transmitting device, such as the units 101, 102, 103 and/or 104 according to a possible embodiment. At 810, a power metric corresponding to each precoder of a plurality of precoders can be generated. The power metric can be an estimated difference in power of each of a plurality of precoders from a reference precoder power, can be an estimated radiated power of each precoder of the plurality of precoders or can be any other power metric. At 820, the power metric can be transmitted. At 830, reference signals can be transmitted. At 840, an index of a precoder with a largest channel quality metric based on the power metric and the reference signals can be received. A separate quality metric can be received with the precoder with the largest channel quality metric.

Figure 9:
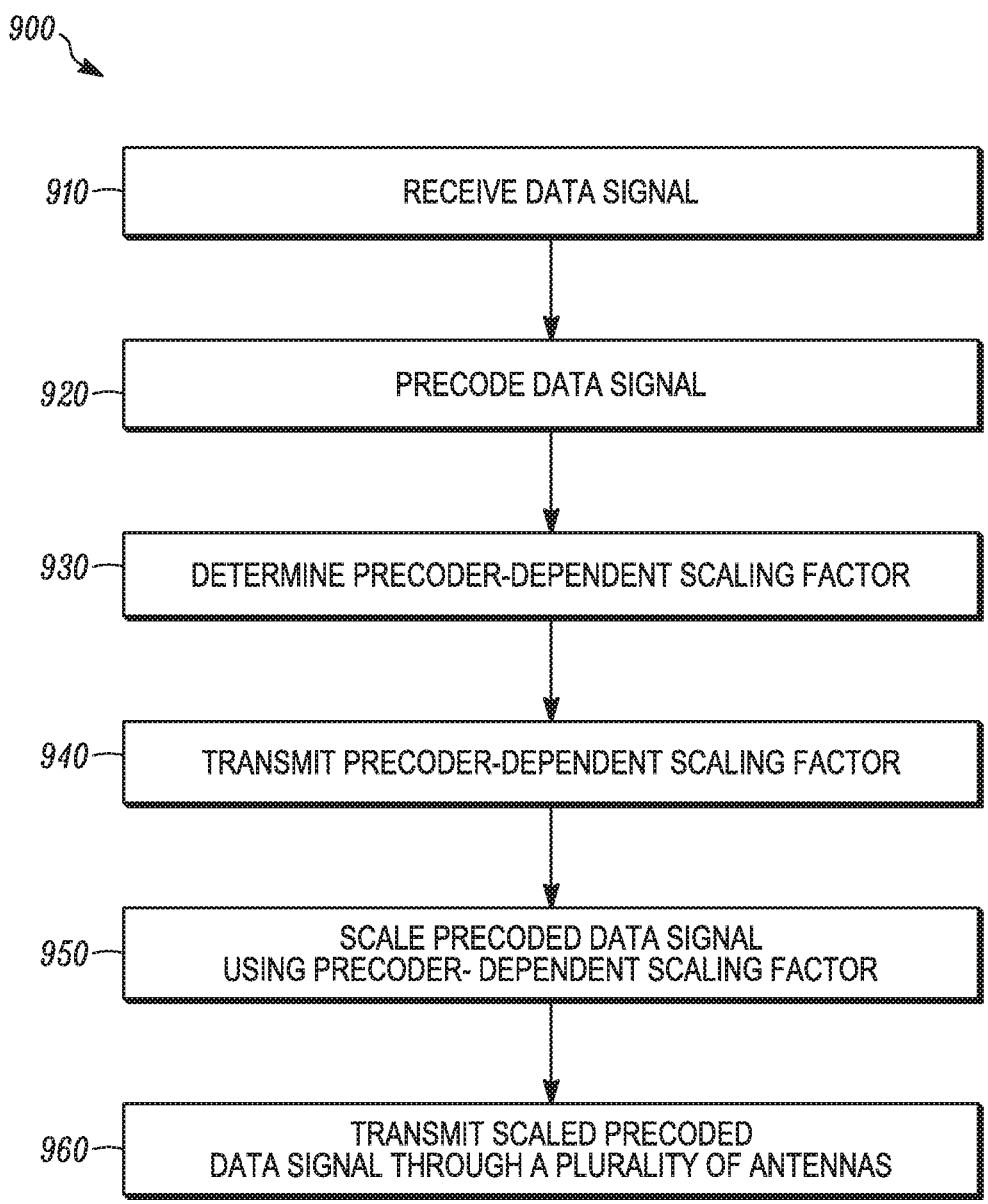
FIG. 9 is an example flowchart illustrating operation of a transmitting device according to a possible embodiment.

FIG. 9 is an example flowchart 900 illustrating operation of a transmitter and/or transmitting device, such as the units 101, 102, 103 and/or 104 according to a possible embodiment. At 910, a data signal can be received. The data signal can be received from a controller, from elements and/or circuitry at an apparatus, from user input, from a wireless data connection, or from any other element that provides a signal for transmission. At 920, the data signal can be precoded.

At 930, a precoder-dependent scaling factor can be determined based on measured return loss of power from the plurality of antennas when the precoder is applied. For example, the return loss of power from the antennas can be estimated separately for each precoder based on an average measured return loss of power over a set of antennas of an antenna array. This can be a linear average instead of a dB average. For example, the return losses can be averaged before converting to dB. The return loss of power from the antennas can also be estimated for each precoder based on a fraction of power reflected from an antenna array computed from measurements of the Voltage Standing Wave Ratio (VSWR) on the transmission line for each antenna in the antenna array. The reflection coefficient $\Gamma$ for an antenna element can be given by $$\Gamma = \frac{VSWR-1}{VSWR+1}, \quad (23)$$

where VSWR can be the voltage wave standing ratio for the antenna element, and the fraction of reflected power can be given by $|\Gamma|^2$. The return loss of power from the antennas can additionally be estimated for each precoder based on measurements of a fraction of the power reflected from an antenna array into a return load of an isolator for each antenna element. The return loss of power from the antennas can further be estimated for each precoder based on a fraction of power reflected from an antenna array and delivered to a return load as a function of a precoder measured using a directional coupler. The return loss of power from the antennas can also be estimated for each precoder based on measurements of s-parameters of an antenna array subsystem.

At 940, the precoder-dependent scaling factor can be transmitted for each precoder of a plurality of precoders. Alternately, a function of the precoder-dependent scaling factor can be transmitted for each precoder of a plurality of precoders. For example, a function of the scaling factor can be a log of the scaling factor, can be an index to a table of predetermined scaling factors, can be a square of the scaling factor, or can be any other function of a scaling factor. As a further example, an index into a table can limit the number of scaling factors, which can be useful to reduce the number of bits needed to send the scaling factor and to make it easier to apply the scaling factors at the transmitter. Also, a matrix Q used to determine the scaling factor for each precoder can be signaled. The matrix Q can be a function of the impedance matrix of the array, the source model, and/or the source impedance. Radiated power $P_T(w)$ corresponding to the precoder w without scaling can be given by $$P_T(w) = w^H Q w. \quad (24)$$

For example, the scaling factor can be proportional to $(P_T(w))^{-1/2}$. The transmitted power can be the radiated power. $P_T(w)$ can be the transmitted power without scaling.

At 950, the precoded data signal can be scaled using a precoder-dependent scaling factor. Scaling can include applying the precoder-dependent scaling factor prior to the precoded data signal reaching a transmitting antenna array. Scaling can be applied before the Digital-to-Analog converter (D/A), after the D/A and before a mixer, or after the mixer, but otherwise prior to the precoded data signal reaching a transmitting antenna array. Scaling the precoded data signal can also include scaling a plurality of precoded data signals by plurality of precoder-dependent scaling vectors. The scaled precoded signal can include a scaled precoded PDSCH signal or scaled precoded data symbols. The scaled precoded signal can also include a scaled precoded DMRS signal or any other scaled precoded signal that can be used by a receiving device to determine a channel quality estimate. Additionally, demodulation reference symbols can be scaled.

At 960, the scaled precoded data signal can be transmitted through a plurality of antennas. Also, the scaled precoded demodulation reference symbols can be transmitted through a plurality of antennas.

Figure 10:
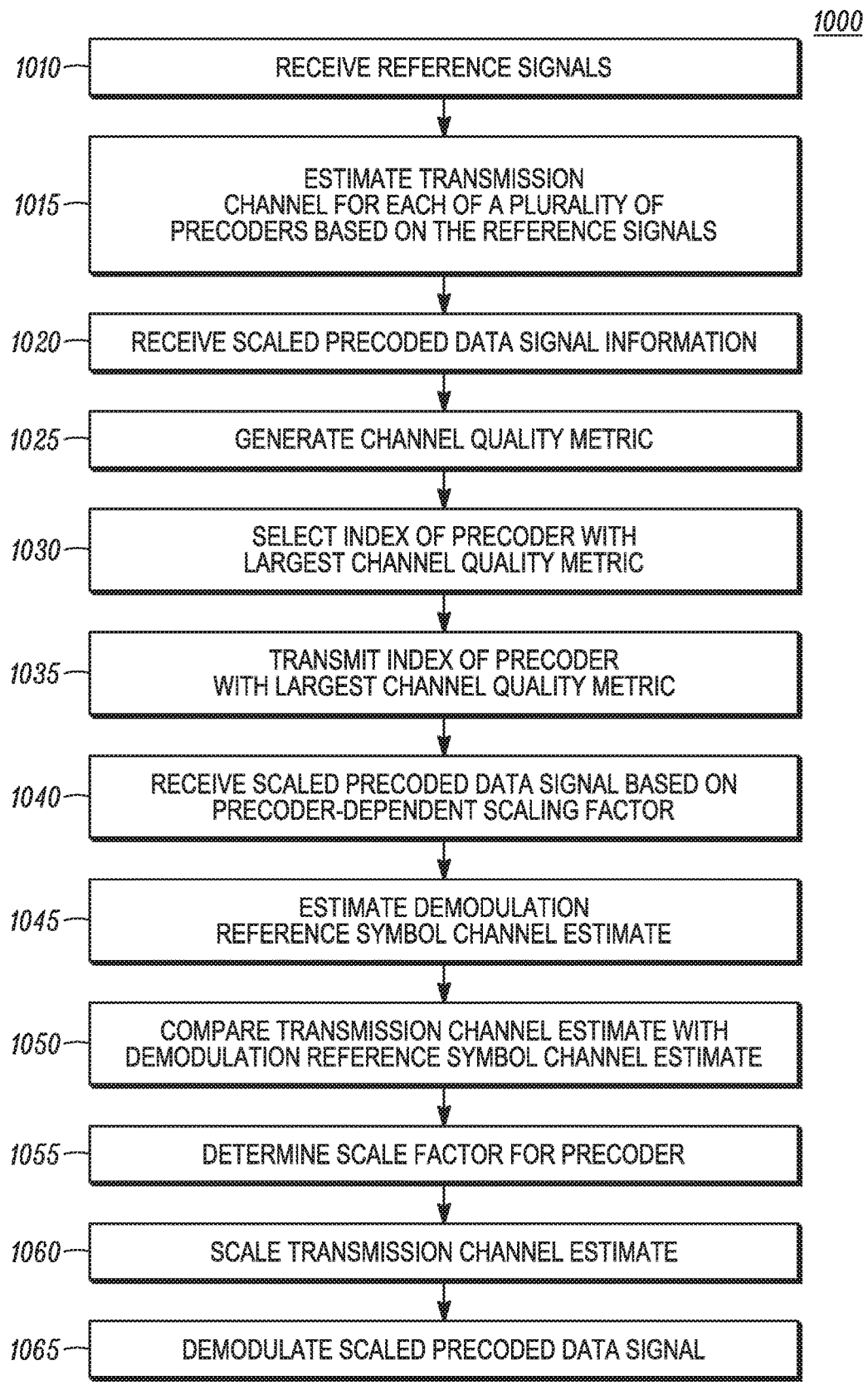
FIG. 10 is an example flowchart illustrating operation of a receiving device according to a possible embodiment.

FIG. 10 is an example flowchart 1000 illustrating operation of a receiving device, such as the units 101, 102, 103 and/or 104 according to a possible embodiment. At 1010, reference signals can be received. The reference signals can be demodulation reference symbols.

At 1015, a transmission channel for each of a plurality of precoders can be estimated based on the received reference signals. The transmission channel for each precoder can be estimated by computing an inner product of a precoding vector of each precoder and a conjugate of per-antenna channel estimates and scaling by the precoder-dependent scaling factor. An antenna element can be an antenna port, where an antenna port can be defined as a weighted linear combination of antenna elements. A port can be defined both by the set of antenna elements and the weights applied to them. This can apply to all embodiments referring to antenna elements. The transmission channel for each of a plurality of precoders can also be estimated based on the received reference signals and each corresponding precoder-dependent scale factor.

At 1020, scaled precoded data signal information based on at least one precoder can be received. The scaled precoded data signal information can include the precoder-dependent scaling factor used for scaling of a precoded data signal, such as a plurality of precoder-dependent scaling factors used for scaling of precoded data signals. Furthermore, a signal including information about a scaling factor can be received. For example, if demodulation reference symbols are not used, the precoder index used for the data can be sent to and received by the receiving device. The received information about the scaling factor can be the actual scaling factor, can be an index to the scaling factor, and/or can be any other information about the scaling factor. The signal can include a matrix Q used to determine the precoder-dependent scaling factor for each precoder. Transmitted power, $P_T(w)$, without scaling for each precoder w, given by matrix Q can be based on $$P_T(w) = w^H Q w. \quad (25)$$

At 1025, a channel quality metric can be generated for each precoder based on a precoder-dependent scaled estimate of the transmission channel For example, the channel quality metric can be a Channel Quality Indicator (CQI), a signal strength, a Signal to Interference plus Noise Ratio (SINR), or any other channel quality metric.

At 1030, an index of a precoder with the largest channel quality metric can be selected. At 1035, the index of a precoder with the largest channel quality metric can be transmitted. The corresponding channel quality metric can be transmitted with the index of the precoder with the largest channel quality metric.

At 1040, a scaled precoded data signal based on a precoder-dependent scaling factor can be received. The scaled precoded data signal can include demodulation reference symbols. At 1045, a demodulation reference symbol channel estimate can be estimated. At 1050, the transmission channel estimate for the precoder used for the scaled precoded data signal can be compared with the demodulation reference symbol channel estimate.

At 1055, a scale factor, such as a precoder-dependent scaling factor, for the precoder can be determined by comparing the demodulation reference symbol channel estimate with the transmission channel estimate. The receiving device may estimate the scaling factor for the precoder used for the demodulation reference symbols. In such a case, the transmitting device can send data using each precoder for the receiver to learn the scaling factor for each precoder. If demodulation reference symbols are used, then the precoder-dependent scaling factor may not be used for demodulation and may only be used for channel quality evaluation. The receiver can learn the scaling factors by comparing the channel estimate for the demodulation reference symbols, assuming that demodulation reference symbols are used, with the precoder-based channel estimate. To do this, the receiver can be told the precoder that was used for the data. Alternatively, the receiver can determine which precoder was used by estimating the channel for each of the precoders and selecting the precoder for which the corresponding estimate best matches the channel estimate for the demodulation reference symbols. Until the receiver learns the scale factor for all precoders, it may not properly estimate the CQI for each precoder and send back the index for the best precoder because it may not know the scaling factor to apply to the precoder-based channel estimate. The receiver can initially go through a learning phase to get the scale factors. During the learning phase, the receiver may assume that all of the scaling factors are unity until they are updated with the correct value. Once the receiver knows the scaling factor for each precoder, it can correctly evaluate the CQI for each precoder.

At 1060, an estimate of a transmission channel can be scaled based on the precoder-dependent scaling factor used for the scaled precoded data signal to generate a scaled precoder-based channel estimate. The scaled estimate of the transmission channel can be used for CQI estimation, for demodulation, and for other purposes. The precoder can be different for different resource blocks of a given subframe.

At 1065, the scaled precoded data signal can be demodulated. The scaled precoded data signal can be demodulated based on the precoder-dependent scaling factor. Demodulating can include demodulating data symbols based on the scaled precoder-based estimate of the transmission channel Scaling may not be needed for demodulation if demodulation reference symbols are used. If no demodulation reference symbols are used, then the precoder based channel estimate can be used to demodulate the signal.

Figure 11:
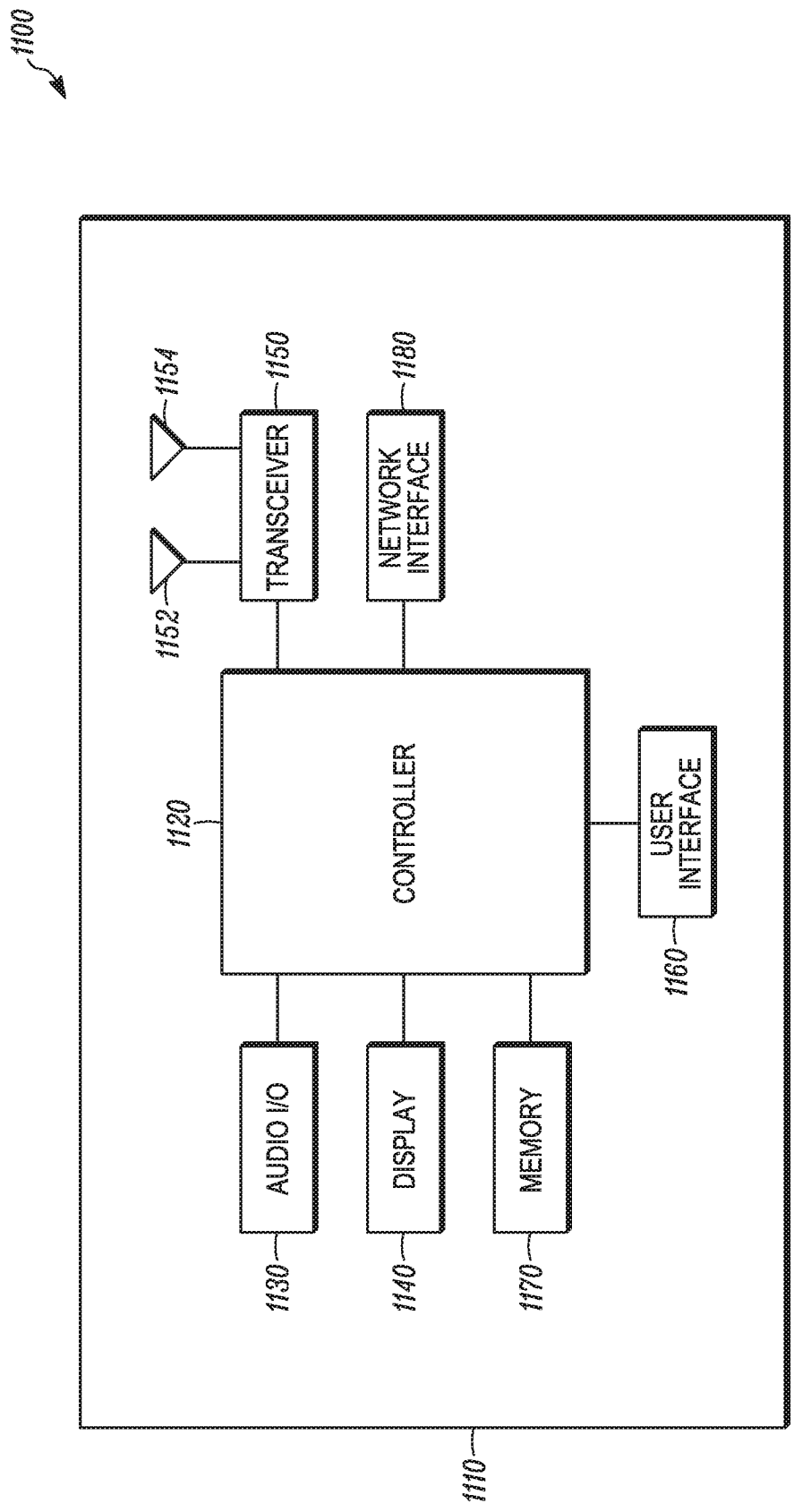
FIG. 11 is an example block diagram of an apparatus 1100 according to a possible embodiment.

FIG. 11 is an example block diagram of an apparatus 1100, such as the units 101, 102, 103, and/or 104, or any other transmitting and/or receiving device according to a possible embodiment. The apparatus 1100 can include a housing 1110, a controller 1120 coupled to the housing 1110, audio input and output circuitry 1130 coupled to the controller 1120, a display 1140 coupled to the controller 1120, a transceiver 1150 coupled to the controller 1120, a plurality of antennas 1152 and 1154 coupled to the transceiver 1150, a user interface 1160 coupled to the controller 1120, a memory 1170 coupled to the controller 1120, and a network interface 1180 coupled to the controller 1120. The apparatus 1100 can perform the methods described in all the embodiments.

The display 1140 can be a viewfinder, a liquid crystal display (LCD), a light emitting diode (LED) display, a plasma display, a projection display, a touch screen, or any other device that displays information. The transceiver 1150 can include a transmitter and/or a receiver. The audio input and output circuitry 1130 can include a microphone, a speaker, a transducer, or any other audio input and output circuitry. The user interface 1160 can include a keypad, a keyboard, buttons, a touch pad, a joystick, a touch screen display, another additional display, or any other device useful for providing an interface between a user and a device. The network interface 1180 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 1170 can include a random access memory, a read only memory, an optical memory, a flash memory, a removable memory, a hard drive, a cache, or any other memory that can be coupled to a wireless communication device.

The apparatus 1100 or the controller 1120 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1170 or elsewhere on the apparatus 1100. The apparatus 1100 and/or the controller 1120 may also use hardware to implement disclosed operations. For example, the controller 1120 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, cloud computing, or other elements for performing the embodiments. In general, the controller 1120 may be any controller or processor device or devices capable of operating a wireless communication device and implementing the disclosed embodiments.

In operation according to a possible embodiment, the transceiver 1150 can receive a power metric corresponding to each precoder of a plurality of precoders and receive reference signals. The power metric can be an estimated difference in power of each of a plurality of precoders from a reference precoder power. The power metric can also be an estimated radiated power of each precoder of the plurality of precoders. The controller 1120 can estimate a transmission channel corresponding to each precoder based on the reference signals. The controller 1120 can scale the estimate of the transmission channel based on the power metric for each precoder. The estimate of the transmission channel can be scaled based on a square root of the estimated difference in power of each precoder of the plurality of precoders. The controller 1120 can generate a channel quality metric for each precoder based on the scaled estimate of the transmission channel The channel quality metric can be a Signal-to-Interference-plus-Noise Ratio (SINR), a Mean Mutual Information per Bit (MMIB), an Exponential Effective SINR Metric (EESM), a channel capacity, a throughput estimate and/or any other channel quality metric. The controller 1120 can compare the channel quality metric for each precoder to determine a precoder with a largest channel quality metric. The transceiver 1150 can transmit an index of a precoder with the largest channel quality metric.

According to a possible implementation of this embodiment, the channel quality metric can be a first channel quality metric. The controller 1120 can generated a second channel quality metric based on the reference signals. The transceiver 1150 can then transmit the index of the precoder having the largest second quality metric and the first channel quality metric for this same precoder.

According to another possible embodiment, the controller 1120 can generate a power metric corresponding to each precoder of a plurality of precoders. The power metric can be an estimated difference in power of each of a plurality of precoders from a reference precoder power or an estimated radiated power of each precoder of the plurality of precoders. The transceiver 1150 can transmit the power metric, transmit reference signals, and receive an index of a precoder with a largest channel quality metric based on the power metric and the reference signals.

According to another possible embodiment, the transceiver 1150 can receive a data signal. The controller 1120 can precode the data signal and scale the precoded data signal using a precoder-dependent scaling factor. The transceiver 1150 can transmit the scaled precoded data signal through a plurality of antennas.

According to another possible embodiment, the transceiver 1150 can receive a scaled precoded data signal based on a precoder-dependent scaling factor. The controller 1120 can demodulate the scaled precoded data signal.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method comprising:
receiving a scaled precoded data signal based on a precoder-dependent precoder transmit power equalizing scaling factor, where the scaled precoded data signal is scaled by using the precoder-dependent precoder transmit power equalizing scaling factor that is dependent on a precoder used to precode the data signal and dependent on a matrix that is based on an antenna array and circuits used to drive the antenna array, and where the precoder-dependent precoder transmit power equalizing scaling factor is determined to equalize transmit power between precoders; and
demodulating the scaled precoded data signal.

2. The method according to claim 1, further comprising:
receiving scaled precoded data signal information based on a precoder, the scaled precoded data signal information including the precoder-dependent precoder transmit power equalizing scaling factor used for scaling of a precoded data signal; and
scaling an estimate of a transmission channel based on the precoder-dependent precoder transmit power equalizing scaling factor used for the scaled precoded data signal to generate a scaled precoder-based channel estimate.

3. The method according to claim 2, further comprising:
generating a channel quality metric for each precoder based on the scaled precoder-based channel estimate;
selecting an index of a precoder with a largest channel quality metric; and
transmitting the index of a precoder with the largest channel quality metric.

4. The method according to claim 3, wherein transmitting the index of a precoder further comprises transmitting the index of a precoder with the largest channel quality metric along with the corresponding channel quality metric.

5. The method according to claim 2, further comprising:
receiving reference signals; and
estimating a transmission channel for each of a plurality of precoders based on the received reference signals.

6. The method according to claim 5,
wherein the reference signals comprise demodulation reference symbols, and
wherein the method further comprises demodulating data symbols based on the estimated transmission channel.

7. The method according to claim 5, wherein estimating the transmission channel comprises estimating a transmission channel for each precoder by computing an inner product of a precoding vector of each precoder and a conjugate of per-antenna channel estimates, and scaling by the precoder-dependent precoder transmit power equalizing scaling factor.

8. The method according to claim 1,
wherein the scaled precoded data signal includes demodulation reference symbols,
wherein the method further comprises:
receiving reference signals;
estimating a transmission channel for each of a plurality of precoders based on the received reference signals and each corresponding precoder-dependent precoder transmit power equalizing scaling factor;
estimating a demodulation reference symbol channel estimate;
comparing the transmission channel estimate for the precoder used for the scaled precoded data signal with the demodulation reference symbol channel estimate; and
determining a scale factor for the precoder by comparing the demodulation reference symbol channel estimate with the transmission channel estimate.

9. The method according to claim 2, wherein demodulating further comprises demodulating data symbols based on the scaled precoder-based channel estimate.

10. The method according to claim 1, further comprising receiving a signal including information about the precoder-dependent precoder transmit power equalizing scaling factor.

11. The method according to claim 10, wherein receiving a signal comprises receiving a matrix Q used to determine the precoder-dependent precoder transmit power equalizing scaling factor for each precoder.

12. The method according to claim 10, wherein $P_T(w)$, transmitted power without scaling for each precoder w, is given by matrix Q is based on $$P_T(w) = w^H Q w.$$

13. The method according to claim 1,
wherein the precoder-dependent precoder transmit power equalizing scaling factor is dependent on the matrix that is based on impedance parameters of the antenna array, and
wherein the antenna array and the circuits used to drive the antenna array were used to transmit the scaled precoded data signal.

14. An apparatus comprising:
a transceiver that receives a scaled precoded data signal based on a precoder-dependent precoder transmit power equalizing scaling factor, where the scaled precoded data signal is scaled by using the precoder-dependent precoder transmit power equalizing scaling factor that is dependent on a precoder used to precode the data signal and dependent on a matrix that is based on an antenna array and circuits used to drive the antenna array, and where the precoder-dependent precoder transmit power equalizing scaling factor is determined to equalize transmit power between precoders; and
a controller that demodulates the scaled precoded data signal.

15. The apparatus according to claim 14,
wherein the transceiver receives scaled precoded data signal information based on a precoder, the scaled precoded data signal information including the precoder-dependent precoder transmit power equalizing scaling factor used for scaling of a precoded data signal, and
wherein the controller scales an estimate of a transmission channel based on the precoder-dependent precoder transmit power equalizing scaling factor used for the scaled precoded data signal to generate a scaled precoder-based channel estimate.

16. The apparatus according to claim 15,
wherein the controller generates a channel quality metric for each precoder based on the scaled precoder-based channel estimate,
wherein the controller selects an index of a precoder with a largest channel quality metric, and
wherein the transceiver transmits the index of a precoder with the largest channel quality metric.

17. The apparatus according to claim 16, wherein transmitting the index of a precoder further comprises transmitting the index of a precoder with the largest channel quality metric along with the corresponding channel quality metric.

18. The apparatus according to claim 15,
wherein the transceiver receives reference signals; and
wherein the controller estimates a transmission channel for each of a plurality of precoders based on the received reference signals.

19. The apparatus according to claim 18,
wherein the reference signals comprise demodulation reference symbols, and
wherein the controller demodulates data symbols based on the estimated transmission channel.

20. The apparatus according to claim 18, wherein estimating the transmission channel comprises estimating a transmission channel for each precoder by computing an inner product of a precoding vector of each precoder and a conjugate of per-antenna channel estimates, and scaling by the precoder-dependent precoder transmit power equalizing scaling factor.

21. The apparatus according to claim 20,
wherein the scaled precoded data signal includes demodulation reference symbols, wherein the transceiver receives reference signals, wherein the controller estimates a transmission channel for each of a plurality of precoders based on the received reference signals and each corresponding precoder-dependent precoder transmit power equalizing scaling factor, wherein the controller estimates a demodulation reference symbol channel estimate, wherein the controller compares the transmission channel estimate for the precoder used for the scaled precoded data signal with the demodulation reference symbol channel estimate, and wherein the controller determines a scale factor for the precoder by comparing the demodulation reference symbol channel estimate with the transmission channel estimate.

22. The apparatus according to claim 14, wherein the precoder-dependent precoder transmit power equalizing scaling factor is dependent on the matrix that is based on impedance parameters of the antenna array, and wherein the antenna array and the circuits used to drive the antenna array were used to transmit the scaled precoded data signal.

* * * * *